US011286838B2

(12) United States Patent
Lupescu et al.

(10) Patent No.: US 11,286,838 B2
(45) Date of Patent: Mar. 29, 2022

(54) METHODS FOR VEHICLE EMISSIONS CONTROL

(71) Applicant: Ford Global Technologies, LLC, Dearborn, MI (US)

(72) Inventors: Jason Aaron Lupescu, Wayne, MI (US); Michael James Uhrich, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 16/452,920

(22) Filed: Jun. 26, 2019

(65) Prior Publication Data

US 2020/0408132 A1   Dec. 31, 2020

(51) Int. Cl.
| | |
|---|---|
| *F01N 3/00* | (2006.01) |
| *F01N 11/00* | (2006.01) |
| *F01N 3/08* | (2006.01) |
| *F02D 41/02* | (2006.01) |

(52) U.S. Cl.
CPC .......... *F01N 11/007* (2013.01); *F01N 3/0835* (2013.01); *F01N 11/002* (2013.01); *F02D 41/025* (2013.01); *F01N 2430/06* (2013.01); *F01N 2560/021* (2013.01); *F01N 2560/026* (2013.01); *F01N 2560/06* (2013.01); *F01N 2570/12* (2013.01)

(58) Field of Classification Search
CPC ...... F01N 11/00; F01N 11/002; F01N 11/007; F01N 2560/026; F01N 2560/021

USPC ......................................................... 60/276
See application file for complete search history.

(56) References Cited

U.S. PATENT DOCUMENTS

| | | | |
|---|---|---|---|
| 5,524,433 | A | 6/1996 | Adamczyk, Jr. et al. |
| 6,185,933 | B1 | 2/2001 | Tsuzuki et al. |
| 6,253,547 | B1 | 7/2001 | Watanabe et al. |
| 6,324,893 | B1 | 12/2001 | Watanabe et al. |
| 6,640,540 | B2 | 11/2003 | Sato et al. |
| 6,647,972 | B2 | 11/2003 | Sato et al. |
| 6,883,307 | B2 | 4/2005 | Iihoshi et al. |

(Continued)

FOREIGN PATENT DOCUMENTS

SE      1000465 A1    5/2010

*Primary Examiner* — Jason D Shanske
(74) *Attorney, Agent, or Firm* — Geoffrey Brumbaugh; McCoy Russell LLP

(57) ABSTRACT

Methods are provided for emissions control of a vehicle. In one example, a method for an engine may include, responsive to a plurality of diagnostic entry conditions being met, indicating degradation of a hydrocarbon trap based on an $NH_3$ amount in an exhaust gas. In some examples, the $NH_3$ amount may be determined based on one or more $NO_x$ sensor outputs. In some examples, the plurality of diagnostic entry conditions may include the engine having been in operation over an initial duration immediately following an engine cold start. Conditions of the exhaust gas following the engine cold start may be opportunistically utilized in determining the $NH_3$ amount from the one or more $NO_x$ sensor outputs. In some examples, the exhaust gas may be actively provided at a predetermined air-fuel ratio to meet at least one of the plurality of diagnostic entry conditions.

20 Claims, 12 Drawing Sheets

(56) References Cited

U.S. PATENT DOCUMENTS

| | | |
|---|---|---|
| 7,628,063 B2 | 12/2009 | Yezerets et al. |
| 8,240,130 B2 | 8/2012 | Sawada et al. |
| 8,448,421 B2 | 5/2013 | Bailey et al. |
| 9,273,587 B2 * | 3/2016 | Khaled .................... F01N 3/103 |
| 2001/0017056 A1 | 8/2001 | Nakagawa et al. |
| 2010/0101213 A1 * | 4/2010 | Tuomivaara .......... F01N 3/2053 60/276 |
| 2015/0033706 A1 * | 2/2015 | Pfaffinger ............... F01N 3/208 60/274 |
| 2015/0086426 A1 * | 3/2015 | DeGeorge ............ F01N 13/009 422/108 |
| 2017/0051654 A1 * | 2/2017 | Gupta .................... F01N 3/035 |
| 2017/0114696 A1 | 4/2017 | Kim et al. |

* cited by examiner

METHODS FOR VEHICLE EMISSIONS CONTROL

FIELD

The present description relates generally to methods for control of exhaust emissions from a vehicle based on ammonia present in the exhaust emissions.

BACKGROUND/SUMMARY

The regulation of vehicle emissions is trending towards implementation of more restrictive policies with the goal of mitigating chemical compounds which may prove disruptive to macroscale ecosystems and global climate. To address such regulations, component catalysts of exhaust gas treatment systems may be developed to mitigate one or more of these potentially problematic chemical species in tandem with other component catalysts of said exhaust gas treatment systems. As examples, nitrogen oxide ($NO_x$), hydrocarbon (HC), and carbon monoxide (CO) emissions may be controlled via component catalysts.

For example, an HC trap may be employed to trap at least HC emissions in an exhaust gas flow during conditions in which other component catalysts may not yet have reached respective light-off temperatures (e.g., immediately following an engine cold start). When the exhaust gas flow subsequently warms up, the HC trap may then release stored emissions to be treated by one or more downstream catalysts (e.g., three-way catalysts, etc.).

In such examples, it may be desirable to ensure sufficient useful emissions reduction performance of the HC trap via an on-board diagnostic (OBD) method. For example, OBD methods may accurately assess the presence of adsorbent material in the HC trap, which may degrade as the HC trap reaches the end of full useful life (e.g., after 150,000 miles). Prior attempts have utilized, as examples, output from oxygen sensors, humidity sensors, temperature sensors, or HC sensors to determine the storage/release of HC emissions by HC traps and then correlate the stored/released HC emissions to degradation of the adsorbent material therein.

However, the inventors herein have identified potential issues with such OBD methods for HC trap monitoring. As a first example, outputs from universal exhaust gas oxygen (UEGO) and heated exhaust gas oxygen (HEGO) sensors are poor indicators of the presence of HC emissions in the underbody location due to 1) the time required for underbody location sensor warm-up to operating temperature generally exceeds the time when stored HC emissions would be desorbed unconverted from the zeolite, which is observed before 200 seconds after engine start or around an HC trap outlet temperature of 100-200° C.; and 2) the sensitivity of oxygen sensors towards detection of alkane HC emissions (that is, the majority of desorbed unconverted HC species) is poor in the range of 0-500 ppm, which is expected to be the level detected during the release phase from the zeolite after one cold start downstream of an efficient close-coupled catalytic converter. As a second example, HC emissions detection via humidity sensors may be obscured by additional detection of excess water. As a third example, temperature sensors alone may not be sufficiently accurate to characterize adsorbent material degradation. As a fourth example, HC sensors may not substantially detect emissions in stoichiometric exhaust (e.g., oxygen deficient exhaust) and may require a long warm-up (which precludes use immediately following an engine cold start).

Accordingly, the inventors herein have provided methods to at least partly address the above issues. One example method includes indicating degradation of an HC trap based on output from one or more $NO_x$ sensors. Specifically, the HC trap may store ammonia ($NH_3$) emissions in addition to HC emissions. $NH_3$ emissions may generally be released at a higher outlet HC trap temperature (e.g., 200-400° C.) than unconverted HC emissions (e.g., 100-200° C.) and thereby may allow for longer warm-up time of one or more sensors in the underbody location. The degradation of the HC trap may be detected based on output from one or more $NO_x$ sensors via, for example, oxidation reactions occurring in oxygen pump cells of the $NO_x$ sensors in tandem with temperature sensors to align $NH_3$ desorption temperature to the functional state of the zeolite. By relying on detection of released $NH_3$ emissions via one or more $NO_x$ sensors to infer HC trap degradation, the low accuracy and/or confounding issues associated with other sensors (e.g., HC sensors, humidity sensors, etc.) may be reduced or eliminated, increasing the accuracy of HC trap degradation detection. However, as $NO_x$ sensors cannot distinguish between $NO_x$ and $NH_3$ emissions, the degradation of the HC trap based on the output from the one or more $NO_x$ sensors is desirably performed during conditions where the one or more $NO_x$ sensors are exclusively detecting $NH_3$. These conditions may include when air-fuel ratio of the exhaust gas flow is lower than an air-fuel ratio threshold (e.g., to limit $NO_x$ emissions), exhaust gas temperature is greater than a temperature threshold (e.g., to ensure $NH_3$ release by the HC trap), and the engine has been in operation for an initial duration following an engine cold start (e.g., to ensure that the one or more $NO_x$ sensors have warmed up). In this way, output from the one or more $NO_x$ sensors may be chiefly ascribed to detection of $NH_3$ emissions and the $NH_3$ emissions may function as a surrogate gas to HC emissions in detecting HC trap adsorbent material degradation, as $NH_3$ may also be stored by the HC trap adsorbent material, yet may possess more detectable desorption characteristics under certain exhaust conditions. Similarly, another example method may include indicating degradation of an HC trap based on output from two or more HEGO sensors via, for example, oxidation reactions occurring in oxygen pump cells of the HEGO sensors in tandem with temperature sensors. Here, the $NH_3$ desorption event may be inferred by a fuel-rich shift (e.g., a higher voltage output) detected by the downstream HEGO sensor relative to the upstream HEGO sensor. Along with the temperature sensor output, the inferred $NH_3$ desorption temperature may be aligned to the functional state of the zeolite.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
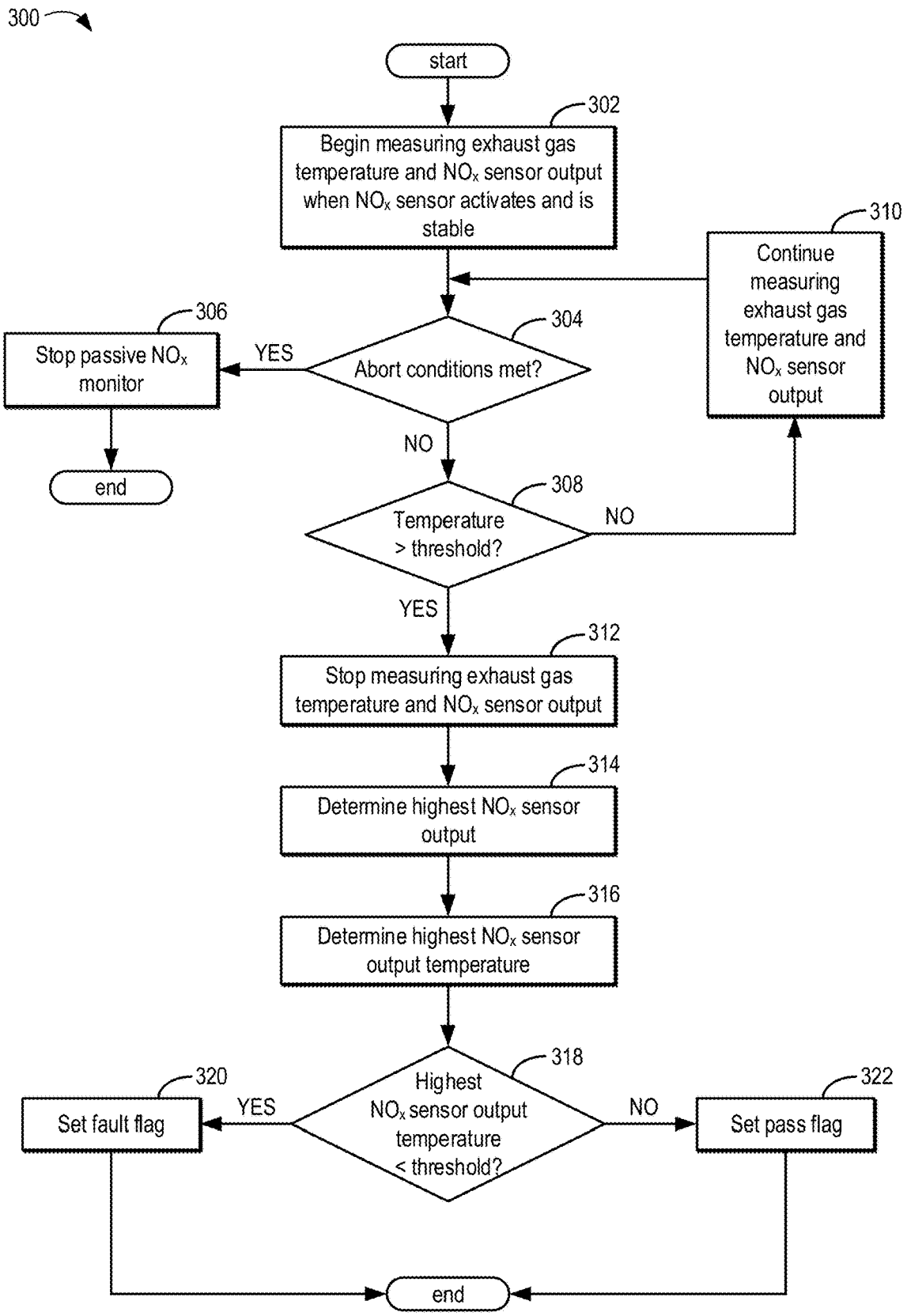
FIG. 3 shows a flow chart for an example method for employing a passive nitrogen oxide ($NO_x$) monitor to diagnose an HC trap.
Figure 4:
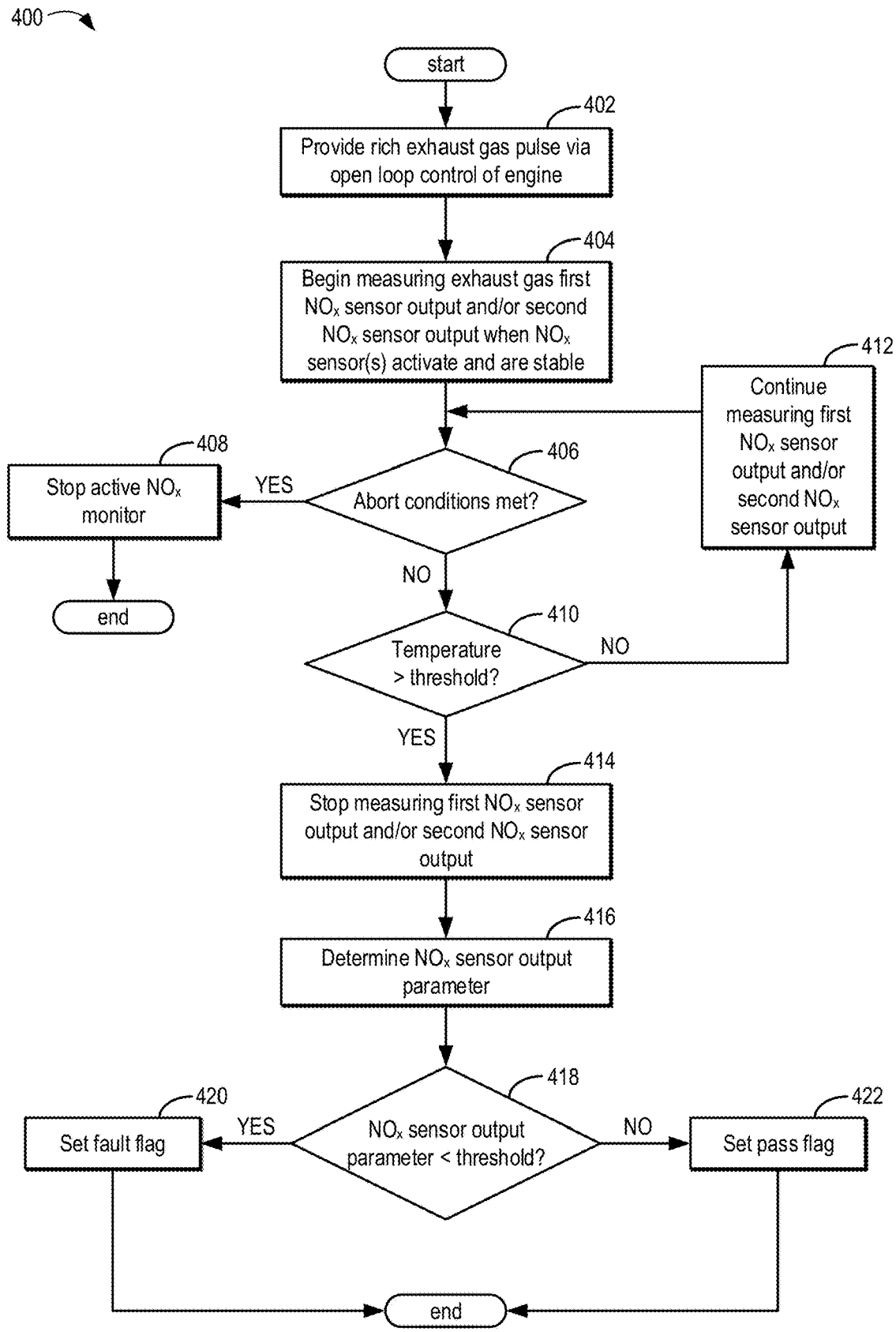
FIG. 4 shows a flow chart for an example method for employing an active $NO_x$ monitor to diagnose an HC trap.
Figure 5:
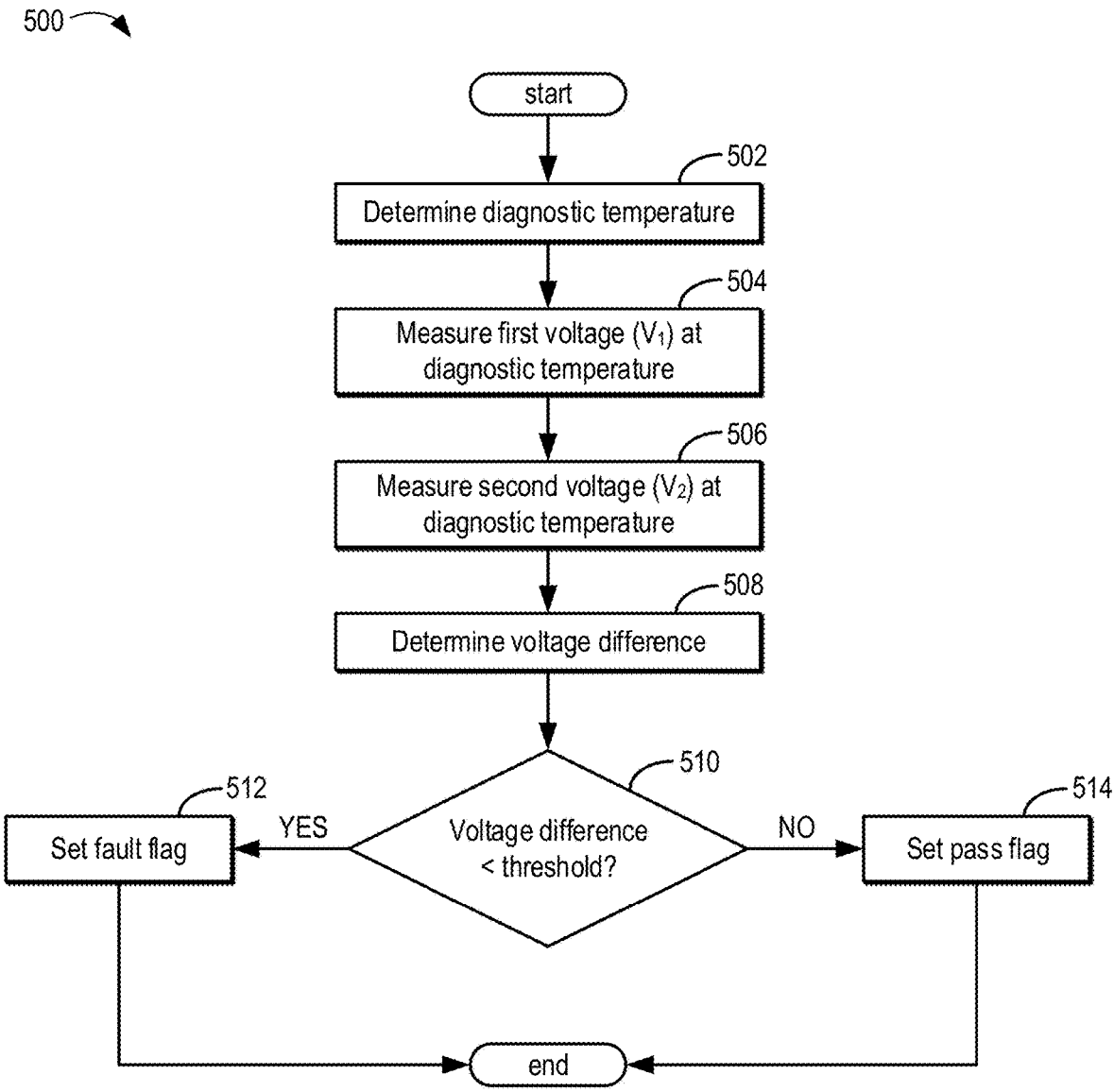
FIG. 5 shows a flow chart for an example method for employing a heated exhaust gas oxygen monitor to diagnose an HC trap.
Figure 6:
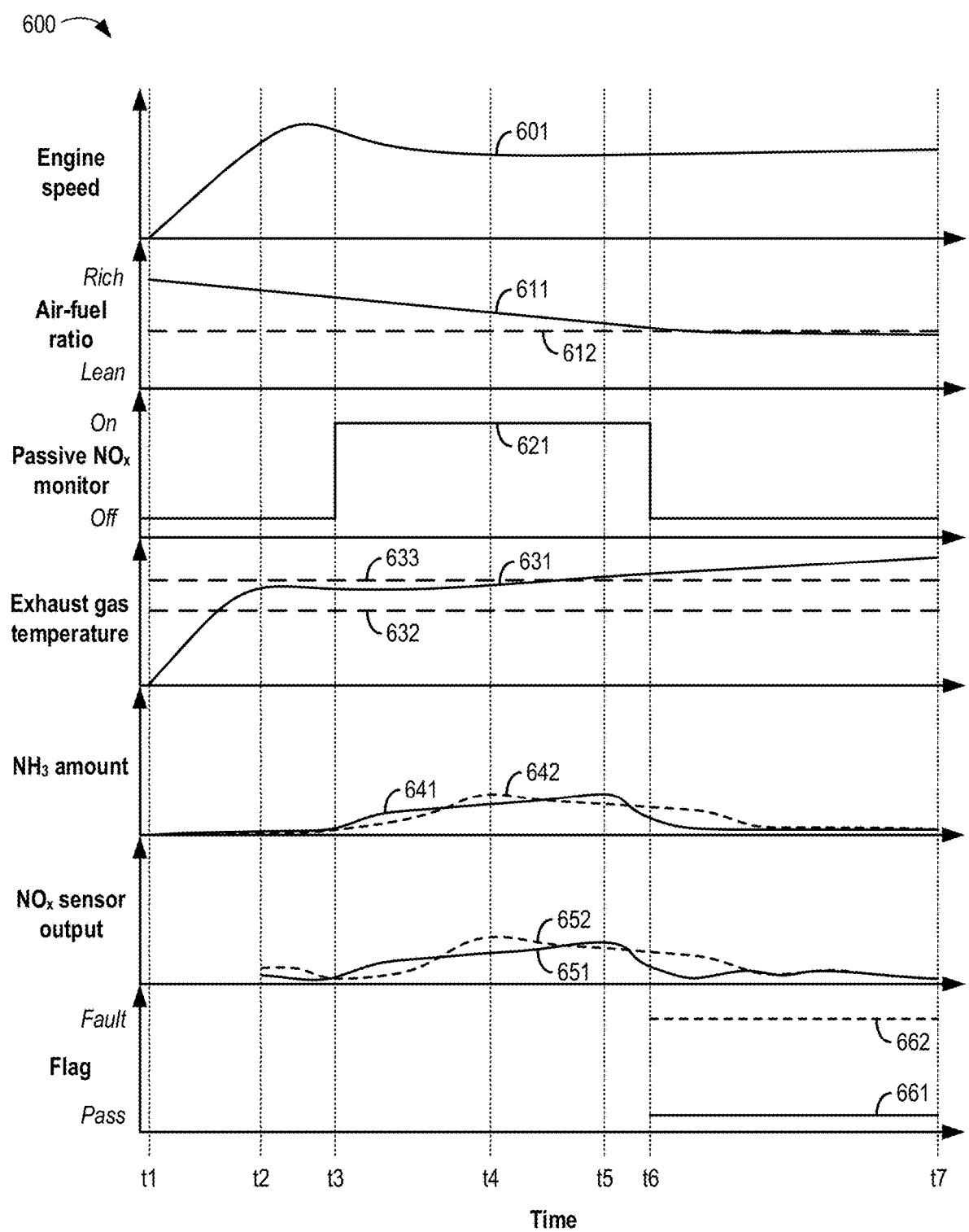
FIG. 6 shows a prophetic example of two diagnostic operations of the HC trap via the passive $NO_x$ monitor.
Figure 7:
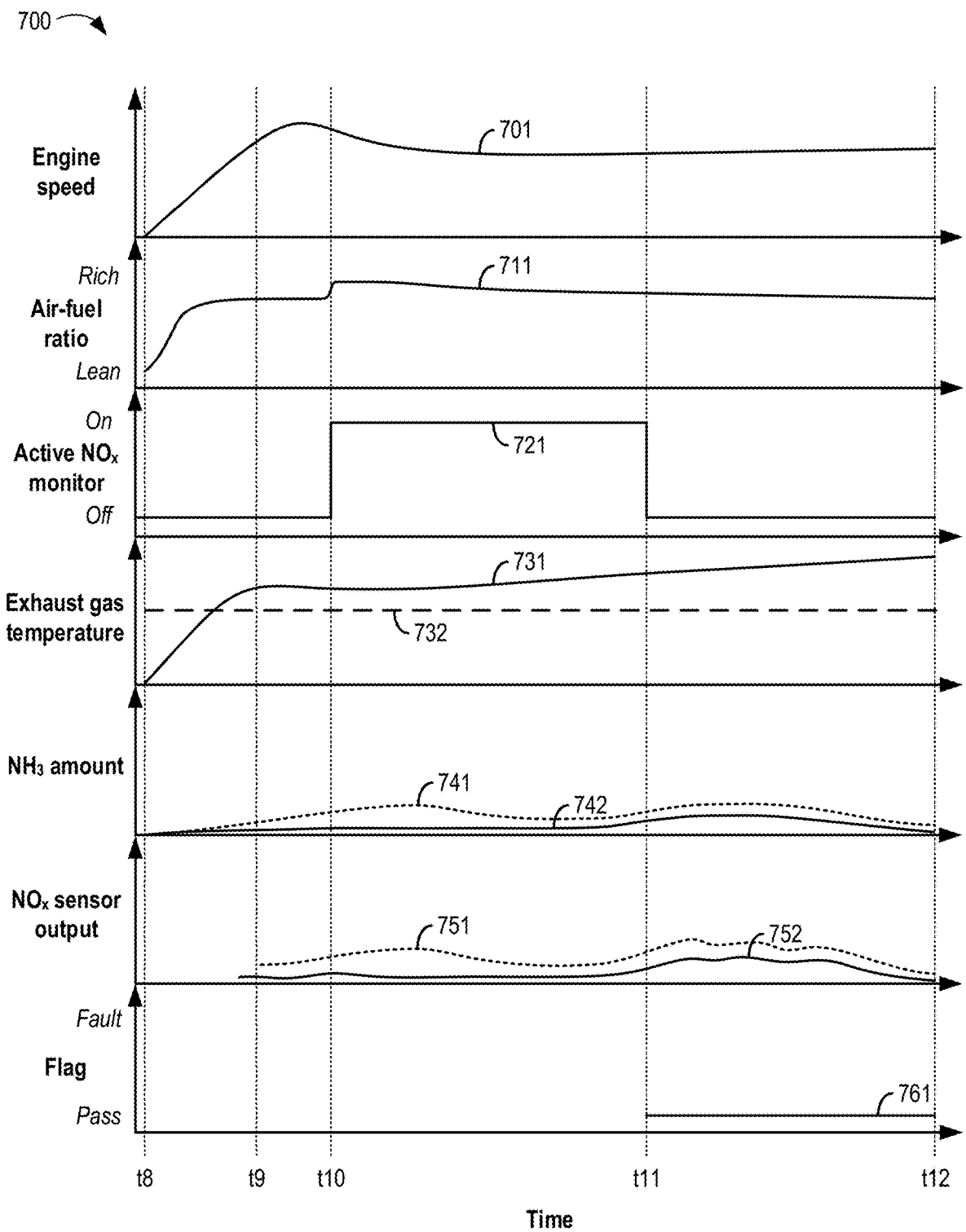
FIG. 7 shows a prophetic example of a first diagnostic operation of the HC trap via the active $NO_x$ monitor.
Figure 8:
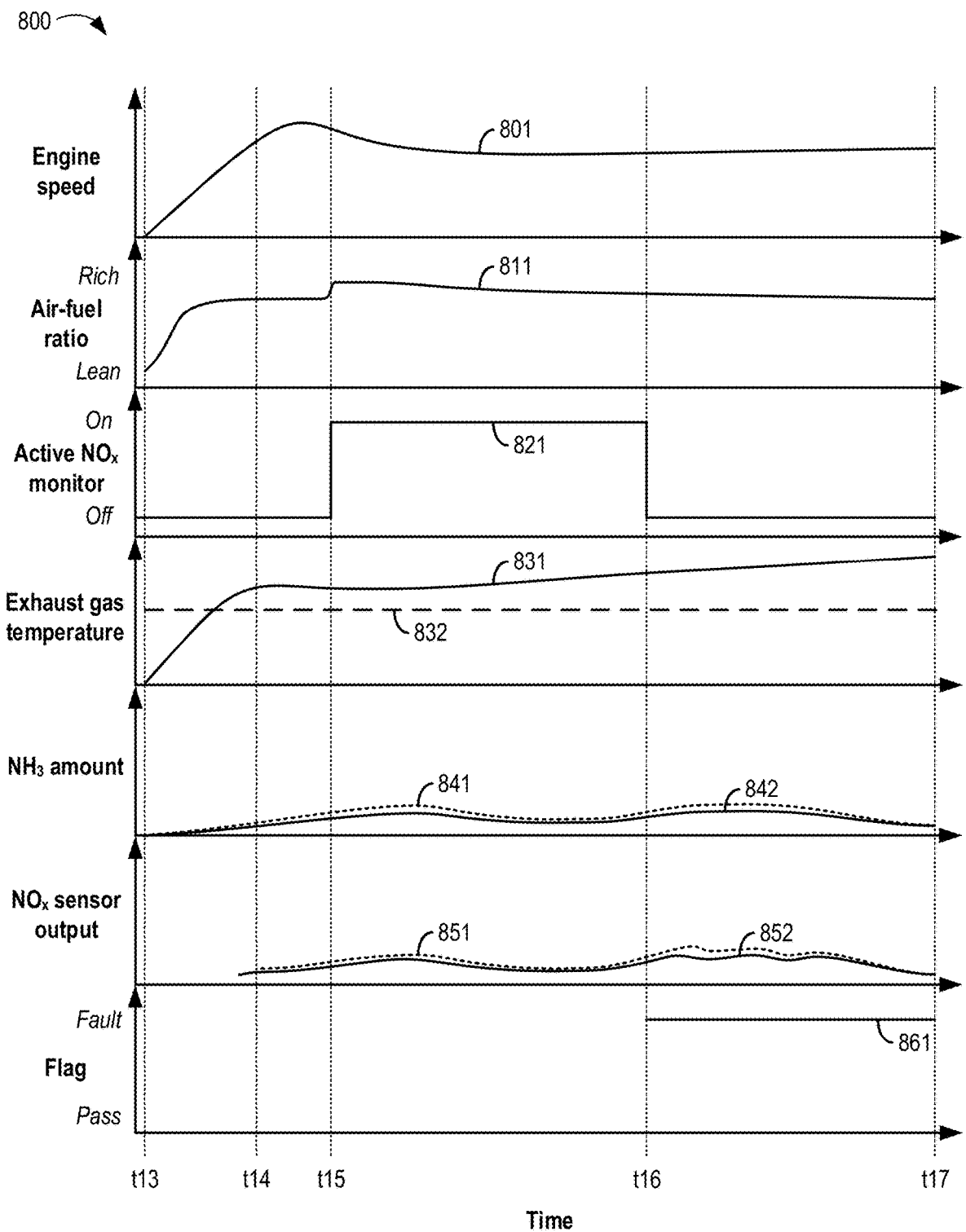
FIG. 8 shows a prophetic example of a second diagnostic operation of the HC trap via the active $NO_x$ monitor.
Figure 9:
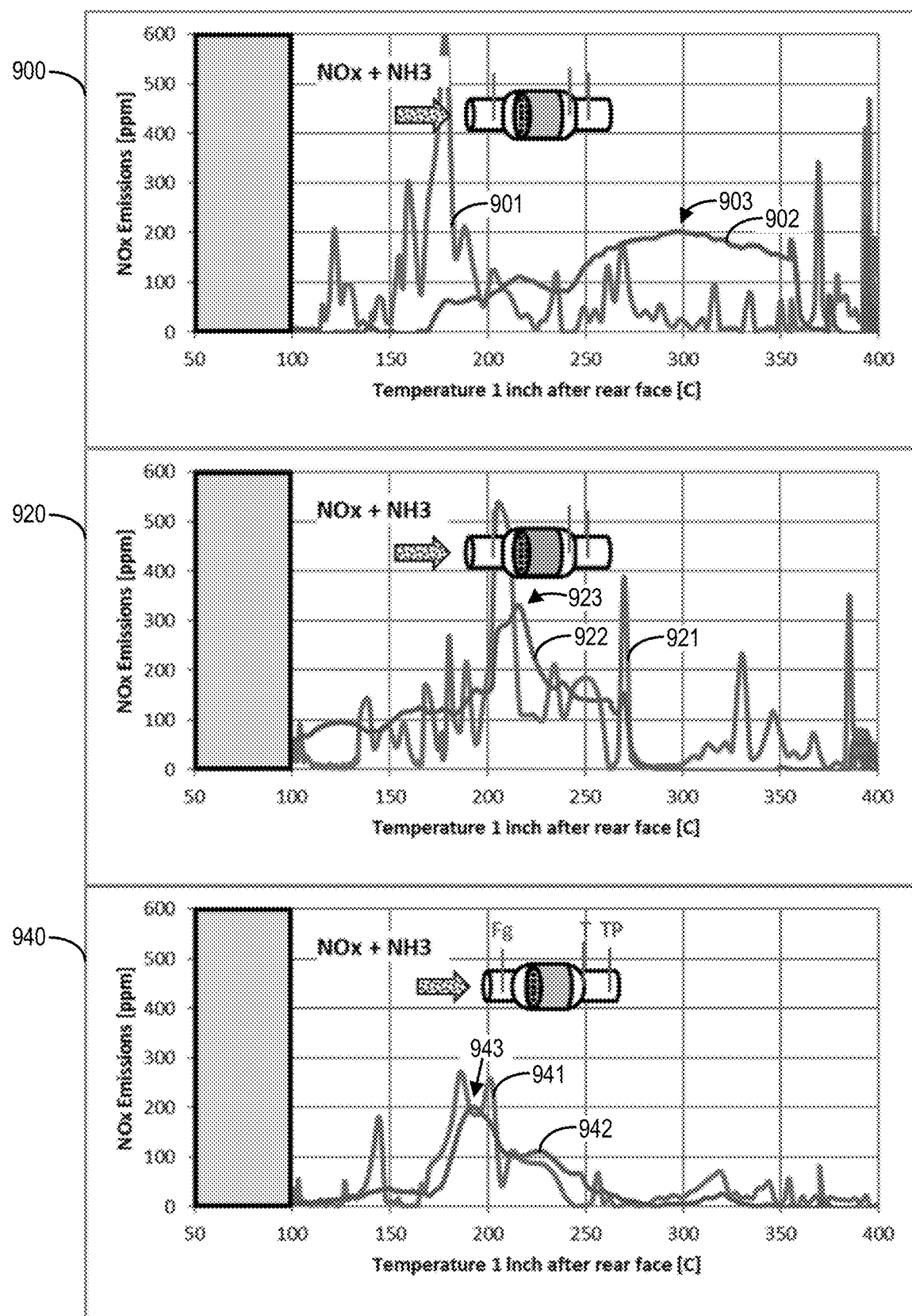
FIG. 9 shows example plots of $NO_x$ sensor outputs upstream and downstream of various exhaust gas treatment systems as a function of exhaust gas temperature.
Figure 10:
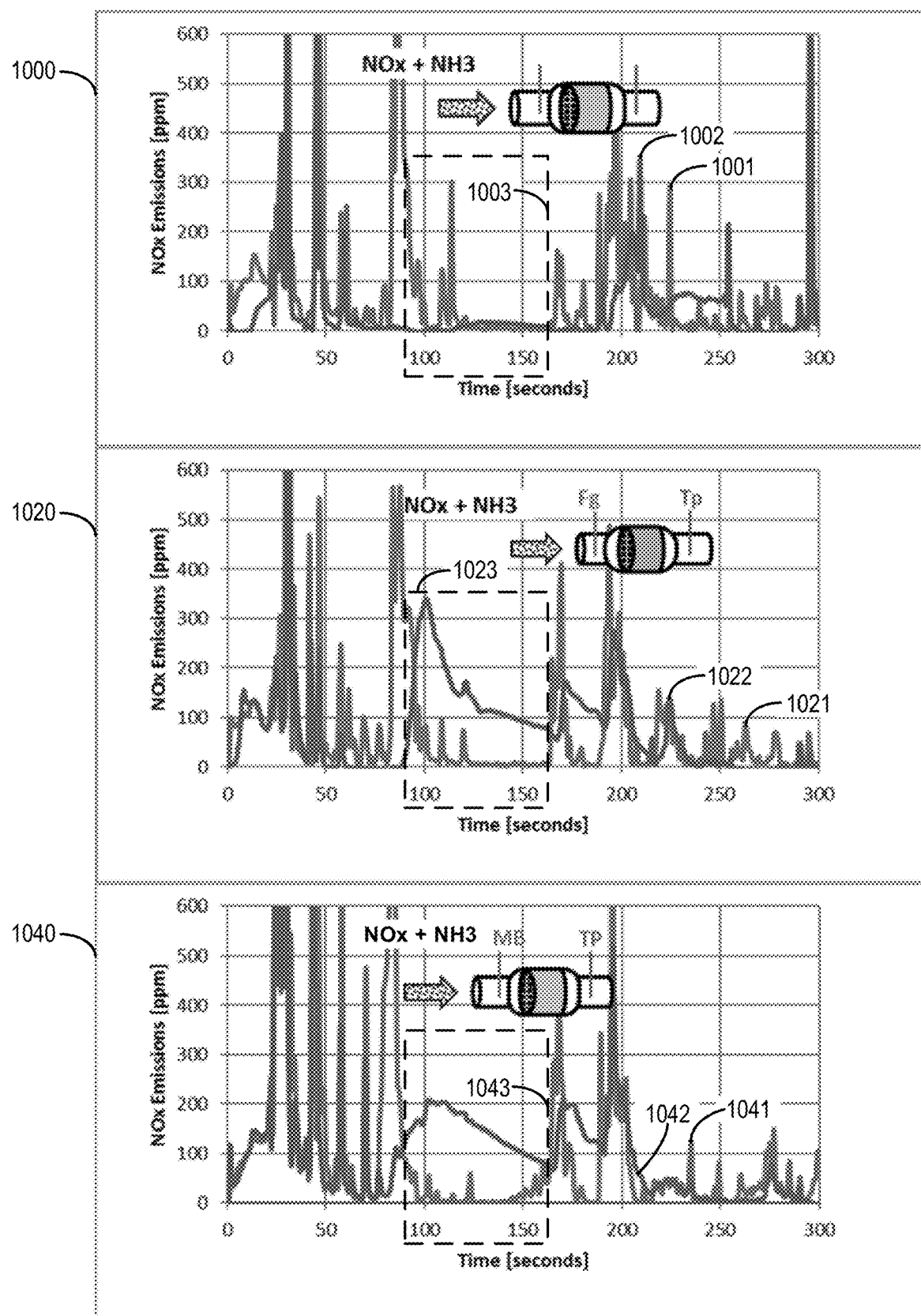
FIG. 10 shows example plots of $NO_x$ sensor outputs upstream and downstream of various exhaust gas treatment systems following a rich exhaust gas pulse as a function of time.
Figure 11:
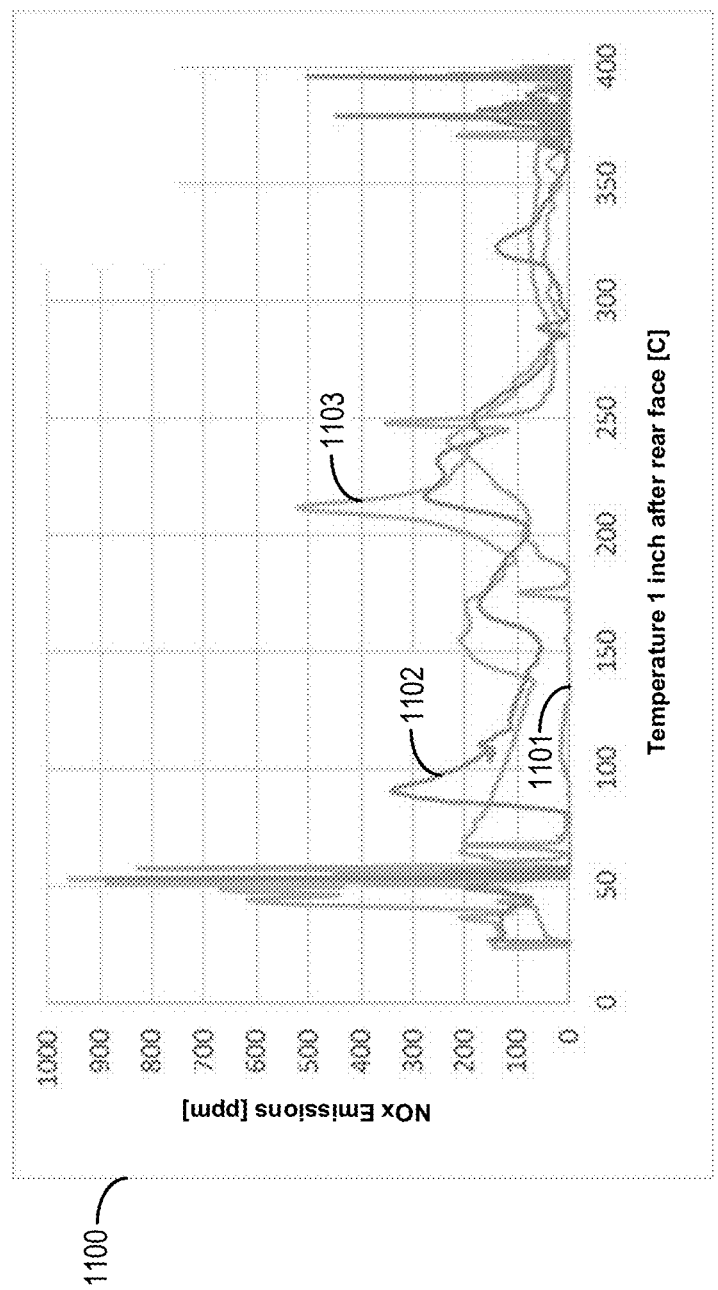
FIG. 11 shows an example plot of $NO_x$ sensor outputs downstream of various exhaust gas treatment systems following the rich exhaust gas pulse as a function of exhaust gas temperature.
Figure 12:
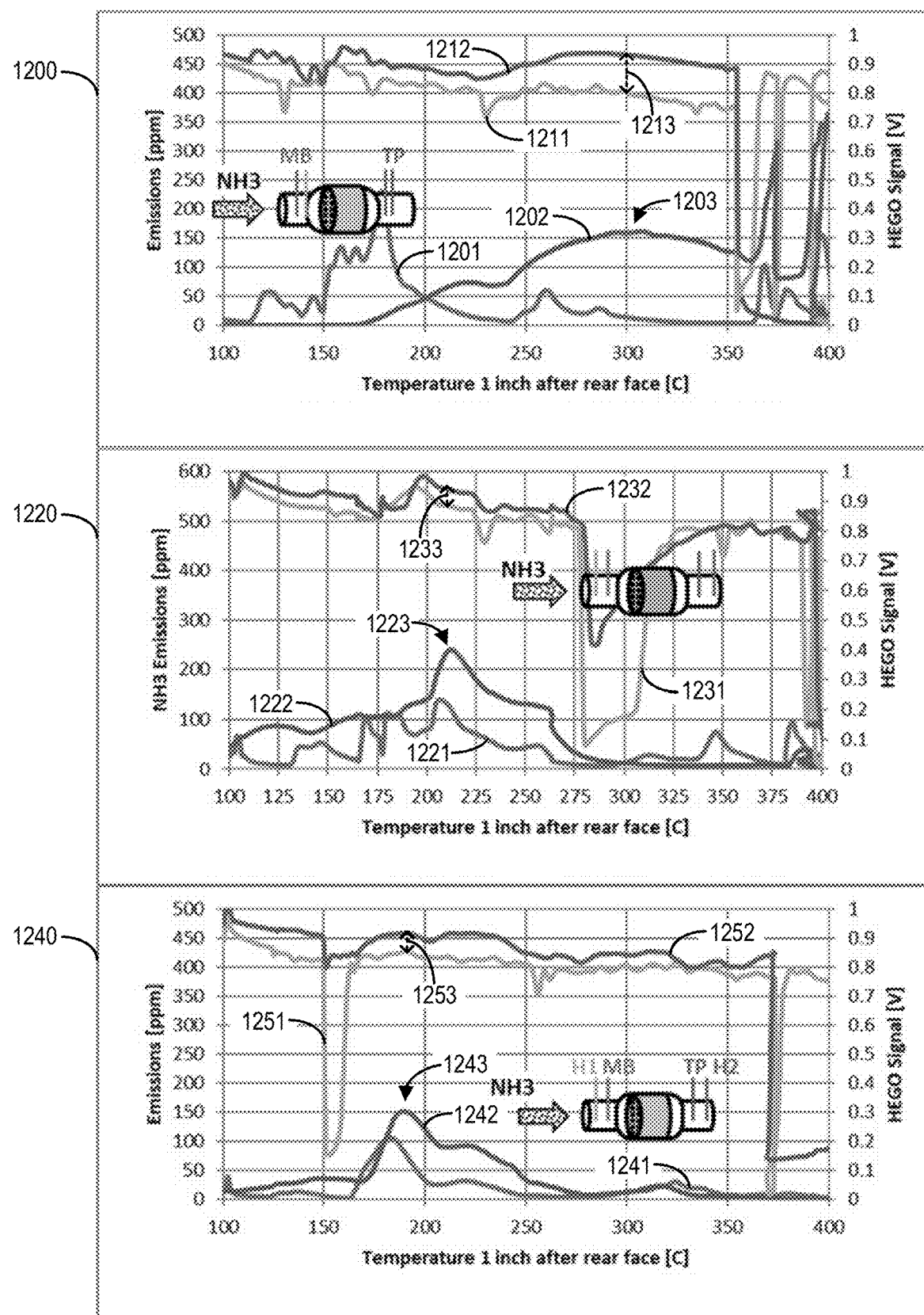
FIG. 12 shows example plots of $NO_x$ sensor outputs and heated exhaust gas oxygen sensor voltage outputs upstream and downstream of various exhaust gas treatment systems as a function of exhaust gas temperature.

The following description relates to methods for diagnosing a hydrocarbon (HC) trap via ammonia ($NH_3$) present in an exhaust gas flow from an engine. The HC trap may be a component of an exhaust gas treatment system of the engine, such as the engine system shown in FIG. 1. A controller of the engine may be configured to perform one or more routines, such as the example routine of FIG. 2, to diagnose the HC trap following an engine cold start. As shown in FIG. 3, a first example HC trap monitor, or passive nitrogen oxide ($NO_x$) monitor, may opportunistically determine an $NH_3$ amount via a $NO_x$ sensor during specific exhaust conditions following the engine cold start. As shown in FIG. 4, a second example HC trap monitor, or active $NO_x$ monitor, may provide a target exhaust gas air-fuel ratio pulse and subsequently determine a generated $NH_3$ amount via one or more $NO_x$ sensors. As shown in FIG. 5, a third example HC trap monitor, or heated exhaust gas oxygen (HEGO) monitor, utilizes outputs from HEGO sensors at a diagnostic temperature to infer the $NH_3$ amount. Example diagnostic runs of the passive $NO_x$ monitor are shown in FIG. 6, and example diagnostic runs of the active $NO_x$ monitor are shown in FIGS. 7 and 8. $NO_x$ sensor outputs upstream and downstream of various exhaust gas treatment systems as a function of exhaust gas temperature are shown in FIG. 9. $NO_x$ sensor outputs upstream and downstream of various exhaust gas treatment systems following a rich exhaust gas pulse as a function of time are shown in FIG. 10. $NO_x$ sensor outputs downstream of various exhaust gas treatment systems following the rich exhaust gas pulse as a function of exhaust gas temperature are shown in FIG. 11. $NO_x$ sensor outputs and HEGO sensor voltage outputs upstream and downstream of various exhaust gas treatment systems as a function of the exhaust gas temperature are shown in FIG. 12.

Figure 1:
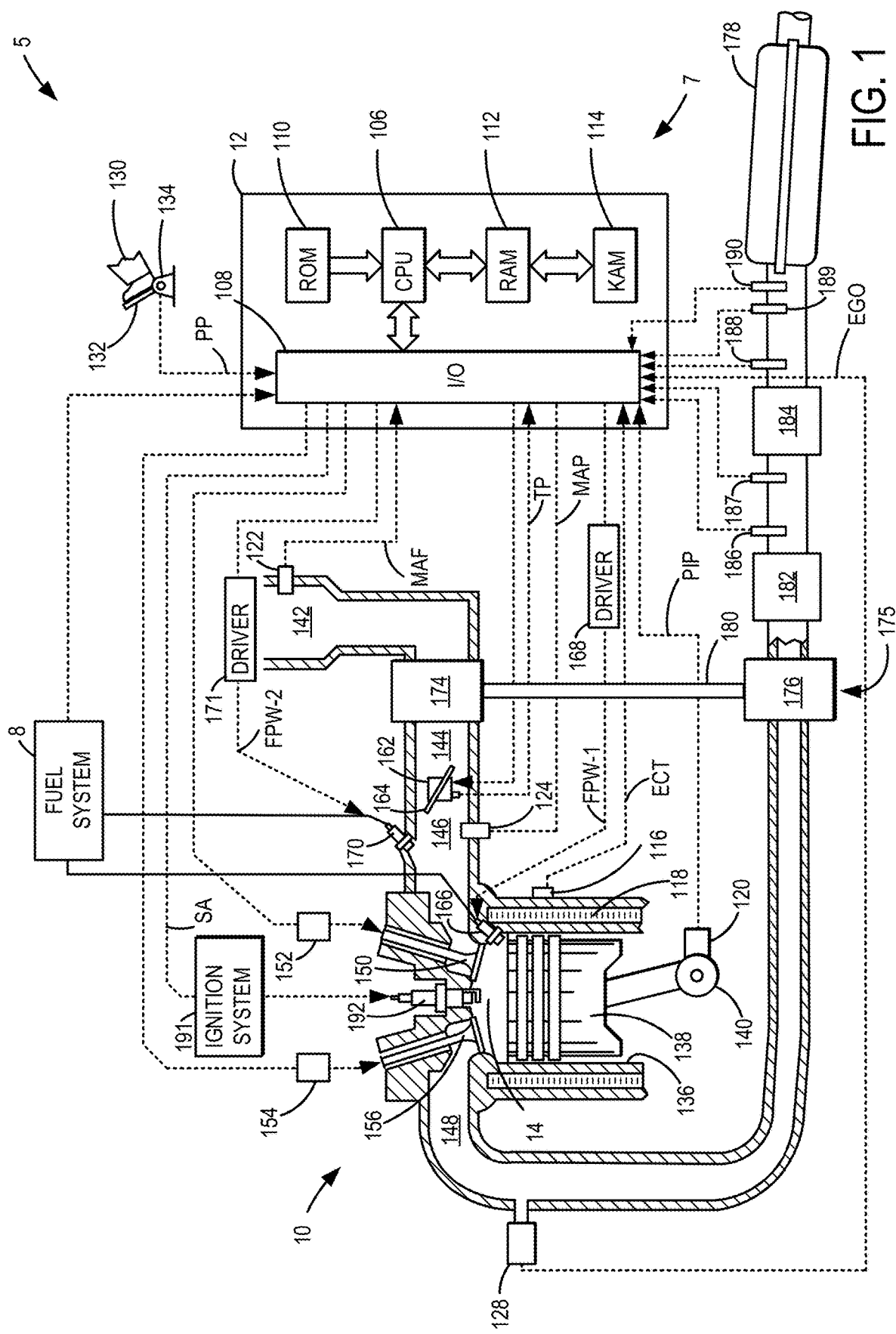
FIG. 1 shows a schematic diagram of an example cylinder of a multi-cylinder engine with an exhaust gas treatment system.

Referring now to FIG. 1, an example of a cylinder of internal combustion engine 10 included in an engine system 7 of vehicle 5 is depicted. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178 (and upstream of first catalyst 182 and second catalyst 184). Sensor 128 may be selected from among various suitable sensors for providing an indication of exhaust gas air-fuel ratio such as a linear oxygen sensor or UEGO (universal or wide-range exhaust gas oxygen), a two-state oxygen sensor or EGO (as depicted), a HEGO (heated EGO), an HC, CO, or $NO_x$ sensor, for example.

Emission control device 178 may be a three way catalyst (TWC), HC trap, $NO_x$ trap, various other emission control devices, or combinations thereof. In one example, the emission control device 178 is arranged in a far vehicle underbody (UB). Comparatively, this location may be downstream of a close-coupled (CC) catalyst location, such as the location of first catalyst 182. In this way, the first catalyst 182 is arranged upstream of the emission control device 178. In one example, the first catalyst 182 may be a TWC, particulate filter (PF), the like, or combinations thereof. In one example, the first catalyst 182 includes a TWC washcoat over inert alumina on a ceramic honeycomb flow-through monolith.

A second catalyst 184 may be arranged in a location between the first catalyst 182 and the emission control device 178. In this way, the second catalyst 184 is arranged downstream of the first catalyst 182 and upstream of the emission control device 178. The second catalyst 184 may be closer to the first catalyst 182 than the emission control device 178. In one example, the second catalyst 184 may be a TWC, oxygen storage catalyst, HC trap, or a combination thereof.

In one example, the second catalyst 184 may be an HC trap 184 including a zeolite molecular adsorbent material.

The HC trap 184 may be configured to store one or more of HC, NH$_3$, and water emissions during a lower, first temperature range of engine operation (e.g., immediately following an engine cold start). For example, the HC trap 184 may store emissions during engine cold starts (such as engine start events where engine temperature at a time of the engine start event is between 0 to 100° C.), and then release the stored emissions once exhaust gas temperature has reached a higher, second temperature range in which downstream catalysts and/or sensors are active. In some examples, stored NH$_3$ may be released in an exhaust gas temperature range of 100 to 400° C. As such, in some examples, the lower, first temperature range may be 0 to 100° C. and the higher, second temperature range may be 100 to 400° C.

The HC trap 184 may store and release emissions (e.g., HCs, NH$_3$, water) by temperature-selective adsorption and desorption. The HC trap 184 may be a pass-through device having a substrate and an active layer. The substrate may have a plurality of channels or openings through which exhaust gas passes. In one example, the substrate is a ceramic honeycomb flow-through monolith. Further non-limiting examples of the substrate include cordierite, aluminum titanate, extruded zeolite and binder, and silicon carbide. Other suitable substrates known in the art may be substituted within the scope of this disclosure. The active layer may be applied to the substrate using a washcoat. The active layer may comprise a zeolite molecular adsorbent material. Non-limiting examples of suitable zeolite molecular adsorbent materials include chabazite (CHA), beta (BEA), and ZSM-5 (MFI). Other suitable zeolite molecular adsorbent materials known in the art may be substituted within the scope of this disclosure. The active layer may further comprise a catalytic converter over-layer (e.g., a TWC) disposed on the zeolite molecular adsorbent material, such that the zeolite molecular adsorbent material is disposed between the catalytic converter over-layer and the substrate. The zeolite molecular adsorbent material may be configured such that HC, NH$_3$, and water emissions are stored therein during the lower, first temperature range. When the exhaust gas temperature reaches the second, higher temperature range, the zeolite molecular adsorbent material may then release the stored emissions through the catalytic converter over-layer, whereby said emissions may be at least partially converted to other chemical byproducts.

It will be appreciated that while the depicted example shows three distinct catalytic emission devices (e.g., the emission control device 178, the first catalyst 182, and the second catalyst 184) coupled to the exhaust passage 148, in other examples, a larger or smaller number of catalytic emission devices may be present. Further, multiple copies of a given catalytic emission device may be present in the depicted order, or in a different order. As to the depicted order, functions of component catalysts may be dependent upon one another to effectively treat exhaust emissions. For example, at lower temperatures, such as during an engine cold start, the catalytic over-layer in the second catalyst 184 may not have reached a minimum operating temperature. As such, the zeolite molecular adsorbent material in the second catalyst 184 may store HC emissions. At higher temperatures, the zeolite molecular adsorbent material may release HC emissions into the exhaust gas which may be treated by the (now active) catalytic converter over-layer, or a further component catalyst downstream (e.g., the emissions control device 178).

A series of related monitoring routines, as described below with reference to FIGS. 2-5, may be operable to diagnose the extent to which the zeolite molecular adsorbent material has degraded over a lifetime of the vehicle 5. In response to the zeolite molecular adsorbent material being degraded beyond a threshold, one or more operating parameters of the engine 10 may be adjusted to limit HC and/or NH$_3$ (e.g., from converted NOR) emissions, and the vehicle operator 130 may be notified.

A difference between the CC location and the far vehicle UB location may include a distance from the engine, wherein the CC location is closer to the engine than the far vehicle UB location. That is to say, components in the CC location are upstream of components in the far vehicle UB location. Further, exhaust gas temperatures experienced by components in the CC location may be higher than temperatures experienced by components in the far vehicle UB position.

A first sensor 186 and a second sensor 187 may be arranged between the first catalyst 182 and the second catalyst 184. Further, a third sensor 188, a fourth sensor 189, and a fifth sensor 190 may be arranged between the second catalyst 184 and the emission control device 178. Sensors 186, 187, 188, 189, and 190 may include one or more of a temperature sensor and an exhaust gas sensor. In one example, the first sensor 186 may be a first NO$_x$ sensor 186. As such, the first sensor 186 may provide feedback to the controller 12 regarding amounts of NO$_x$ and NH$_3$ in an exhaust gas flow upstream of the second catalyst 184. In an additional or alternative example, the third sensor 188 may be a second NOR sensor 188. As such, the third sensor 188 may provide feedback to the controller 12 regarding amounts of NOR and NH$_3$ in the exhaust gas flow downstream of the second catalyst 184. In an additional or alternative example, the fourth sensor 189 may be a temperature sensor 189. As such, the fourth sensor 189 may provide feedback to the controller 12 regarding a temperature of the exhaust gas flow downstream of the second catalyst 184. In some examples, as described in greater detail below with reference to FIGS. 3 and 4, feedback from the sensors 186, 188, and/or 189 may be used by the controller 12 to detect degradation of the second catalyst 184. In examples wherein the second catalyst 184 is the HC trap 184 and the HC trap 184 is degraded, the HC trap 184 may store NH$_3$ less effectively due to degraded zeolite molecular adsorbent material therein relative to the HC trap 184 in a fully functional state. Correspondingly, the amount of NH$_3$ detected (e.g., by the second NO$_x$ sensor 188) downstream of the HC trap 184 may be greater during a temperature range wherein the NH$_3$ is typically released from the HC trap 184 in the fully functional state. Further, a temperature at which a highest, or peak, NH$_3$ amount is detected (e.g., by the temperature sensor 189) during the temperature range of typical NH$_3$ release may shift when storage capabilities of the HC trap 184 are degraded. The controller 12 may thus infer zeolite molecular adsorbent material degradation responsive to feedback from sensors 186, 188, and/or 189 indicative of either a greater amount of NH$_3$ released during the temperature range of typical NH$_3$ release or of a shifted peak amount of NH$_3$ released during the temperature range of typical NH$_3$ release.

In one example, the second sensor 187 may be a first HEGO sensor 187. As such, the second sensor 187 may provide feedback to the controller 12 regarding an amount of oxygen in an exhaust gas flow upstream of the second catalyst 184. In an additional or alternative example, the fifth sensor 190 may be a second HEGO sensor 190. As such, the fifth sensor 190 may provide feedback to the controller 12 regarding an amount of oxygen in the exhaust gas flow downstream of the second catalyst 184. In some examples, as described in greater detail below with reference to FIG. 5, feedback from the sensors 187 and/or 190 may be used by the controller 12 to detect degradation of the second catalyst 184. In examples wherein the second catalyst 184 is the HC trap 184 and the HC trap 184 is degraded, the HC trap 184 may store $NH_3$ less effectively due to degraded zeolite molecular adsorbent material therein relative to the HC trap 184 in a fully functional state. Correspondingly, the amount of oxygen detected (e.g., by the second HEGO sensor 190) downstream of the HC trap 184 may be less than detected upstream of the HC trap (e.g., by the first HEGO sensor 187) during a temperature range wherein the $NH_3$ is typically released from the HC trap 184 in the fully functional state, as compared to a lower temperature range for a degraded HC trap. The controller 12 may thus infer zeolite molecular adsorbent material degradation responsive to feedback from sensors 187 and/or 190 indicative of a greater amount of $NH_3$ released during the temperature range of typical $NH_3$ release.

It will be appreciated that while the depicted example shows five distinct sensors 186, 187, 188, 189, and 190 coupled to the exhaust passage 148, in other examples, a larger or smaller number of sensors may be present. Further, multiple copies of a given sensor may be present in the depicted order, or in a different order.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 191 may provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 and the cylinder 14. In one example, moving the intake valve 150 to a more open position allows more air to flow from the intake passage 146 to the cylinder 14 than its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The controller 12 receives signals from the various sensors of FIG. 1 and then may notify the vehicle operator 130 of potential issues and/or employ the various actuators of FIG. 1 to adjust engine operation based on the received signals and instructions stored on a memory of the controller. That is, the non-transitory read-only memory chip 110 may be programmed with non-transitory, computer readable data representing instructions executable by the microprocessor unit 106 for performing the routines described below as well as other variants that are anticipated but not specifically listed. Example diagnostic routines are described hereinbelow with reference to FIGS. 2-5. For example, the controller 12 may be operable to generate a notification to the vehicle operator 130 indicating degradation of one or more of the first catalyst 182, the second catalyst 184, and the emission control device 178, as based upon the diagnostic routines using input from one or more sensors 186, 187, 188, 189, and 190. Further, adjusting engine operating parameters based on determined degradation of one or more of the first catalyst 182, the second catalyst 184, and the emission control device 178, may include adjusting fuel injector 170 and/or injector 166, adjusting throttle 162, and so forth, as based upon the diagnostic routines using input from one or more sensors 186, 187, 188, 189, and 190.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 2:
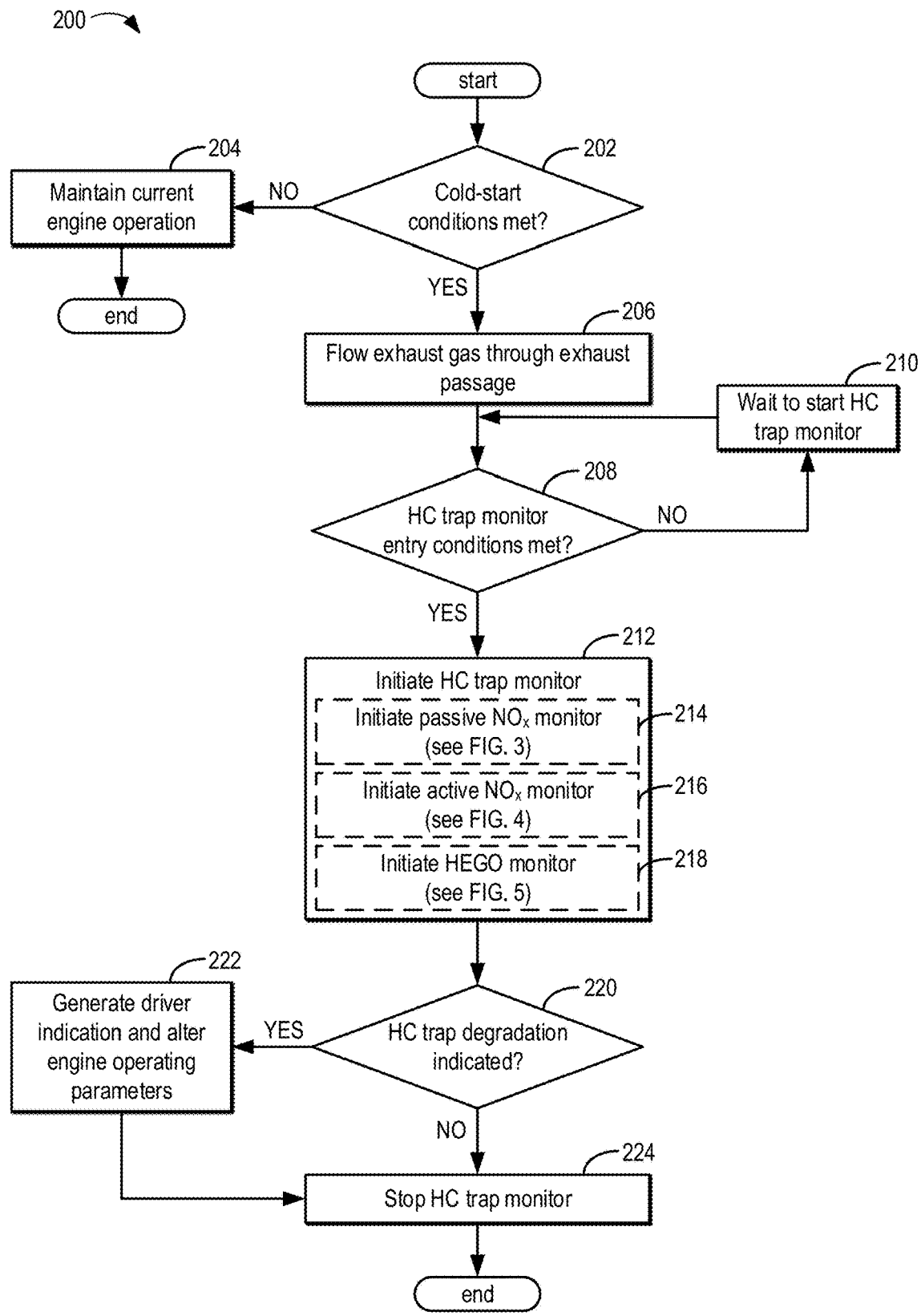
FIG. 2 shows a flow chart for an example method for diagnosing a hydrocarbon (HC) trap.

Referring now to FIG. 2, an example routine is shown for an exhaust gas treatment system. The exhaust gas treatment system may include a TWC disposed in an exhaust passage upstream of an HC trap, wherein the HC trap may include a substrate, a zeolite molecular adsorbent material, and a catalytic converter over-layer. The TWC and the HC trap may be the first catalyst 182 and the second catalyst 184, respectively, of FIG. 1. In some examples, further catalysts and/or traps may be disposed downstream of the HC trap in the exhaust passage (e.g., the emissions control device 178 of FIG. 1). Instructions for carrying out routine 200 and further methods included herein may be executed by a controller based on instructions stored on a memory of the controller and in conjunction with signals received from sensors of an engine system, such as the sensors described above with reference to FIG. 1. For example, sensors 186, 187, 188, 189, and/or 190 may supply feedback to controller 12 of engine system 7. Further, the controller may employ engine actuators of the engine system to adjust engine operation, according to the methods described below. As such, routine 200 may enable cold-start emission control in an engine-propelled vehicle.

At 202, routine 200 may include determining whether one or more cold-start conditions are met. The controller may estimate one or more engine operating parameters, such as an engine temperature, engine speed, and/or exhaust gas air-fuel ratio (AFR), and infer an engine cold start based on the estimated conditions. An engine start may be confirmed responsive to an operator torque demand that requires an engine to be restarted from a condition of rest. The one or more cold-start conditions may be met responsive to engine temperature being lower than a threshold at a time of engine start. The threshold temperature for the engine cold start may be a light-off temperature of an exhaust catalyst, for example. With reference to the exhaust system of FIG. 1, wherein multiple exhaust catalysts are coupled to the exhaust passage, the threshold temperature for the engine cold start may be a function of a light-off temperature of each exhaust catalyst. For example, the threshold temperature for the engine cold start may be a minimum of one or more light-off temperatures of the exhaust catalysts. As another example, the threshold temperature for the engine cold start may be a statistical or weighted average of one or more light-off temperatures of the exhaust catalysts. The one or more cold-start conditions may also be inferred based on ambient temperature being lower than a threshold ambient temperature.

If the cold-start conditions are not met, for example if the engine temperature is higher than the threshold temperature for the engine cold start, routine 200 may progress to 204 to maintain current engine operation. That is, exhaust gas may be flowed through the exhaust passage, but no diagnostic routine is run to assess HC trap degradation. Routine 200 then ends.

If the cold-start conditions are met, for example if the engine temperature is lower than the threshold temperature for the engine cold start, routine 200 may progress to 206 to flow exhaust gas through the exhaust passage. Therein, in some examples, at least a portion of $NH_3$ emissions are stored by the HC trap. In some examples, the $NH_3$ emissions may be a product of $NO_x$ emissions conversion at a warmed-up TWC upstream of the HC trap, such as the first catalyst 182, and when the exhaust gas air-fuel ratio is at or below stoichiometry. In other examples, $NH_3$ emissions may be a product of upstream exhaust gas or fluid injection. The flowing the exhaust gas through the exhaust gas passage may comprise the exhaust gas passing through component catalysts of the exhaust gas treatment system. For example, the arrangement of the component catalysts of the exhaust gas treatment system may be such that the exhaust gas flows through the TWC followed by the HC trap. However, in some examples, additional or alternative catalysts/arrangements may be employed. Immediately following the cold start, one or more catalysts in the exhaust gas treatment system may not be active. For example, the TWC may initially be inactive (e.g., the TWC may not be warmed up immediately upon engine cold start) and may not be able to perform substantially any emissions control functions.

At 208, routine 200 may include determining whether diagnostic (e.g., HC trap monitor) entry conditions have been met. HC trap monitor entry may be determined based on various vehicle and engine operating conditions advantageous for accurate $NH_3$ emissions determination by one or more $NO_x$ sensors (e.g., stored $NH_3$ is being released by the HC trap, relatively little $NO_x$ is present in the exhaust gas, the one or more $NO_x$ sensors are warm enough to reliably detect emissions, etc.)

In one example, the HC trap monitor entry conditions may include exhaust gas air-fuel ratio being below an entry air-fuel ratio threshold. In some examples, the entry air-fuel ratio threshold may be an exhaust gas air-fuel ratio (e.g., 0.95) to limit $NO_x$ emissions. In an additional or alternative example, the HC trap monitor entry conditions may include exhaust gas temperature being greater than an entry temperature threshold. In some examples, the entry temperature threshold may be an exhaust gas temperature (e.g., 100° C.) above which the stored $NH_3$ may begin to be released by the HC trap. In other examples, the entry temperature threshold may be a light-off temperature of a catalyst disposed upstream of the HC trap which may convert $NO_x$ emissions into byproducts such as $NH_3$.

In an additional or alternative example, the HC trap monitor entry conditions may include the engine having been in continuous operation (e.g., without any intervening shutdowns) over an initial duration immediately following the engine cold start after which the one or more $NO_x$ sensors are assumed to be sufficiently warmed up (e.g., an estimated duration required for the one or more $NO_x$ sensors to reach 100° C.). In some examples, the HC trap monitor entry conditions may further include the exhaust gas temperature measured at the HC trap location being less than 300° C. over the initial duration. As such, the one or more $NO_x$ sensors disposed in the exhaust passage may be active and able to detect stored/released cold-start $NH_3$ later as the HC trap warms up to 400° C.

If the HC trap monitor entry conditions are not met, for example if the engine has not been in operation over the initial duration immediately following the engine cold start, routine 200 may progress to 210 to wait to start an HC trap monitor. Routine 200 may then return to 208.

If HC trap monitor entry conditions are met, routine 200 may progress to 212 to initiate the HC trap monitor. As a first example, at 214, the initiating the HC trap monitor may include initiating a passive $NO_x$ monitor to opportunistically determine an $NH_3$ amount during specific exhaust conditions following the engine cold start, as will be described below with reference to FIG. 3. As a second example, at 216, the initiating the HC trap monitor may include initiating an active $NO_x$ monitor to provide a target exhaust gas air-fuel ratio and thereby generate exhaust conditions advantageous to determining the $NH_3$ amount, as will be described below with reference to FIG. 4. In some examples, the active $NO_x$ monitor may be employed as an alternative to the passive $NO_x$ monitor, such as when the engine cold start occurs in a relatively high ambient temperature (e.g., 20° C.), which may result in an exhaust gas air-fuel ratio above the entry air-fuel ratio threshold. As a third example, at 218, the initiating the HC trap monitor may include initiating a HEGO monitor to utilize outputs from HEGO sensors at a diagnostic temperature to infer the $NH_3$ amount, as will be described below with reference to FIG. 5.

In some examples, initiating the HC trap monitor may include initiating one or more of the passive $NO_x$ monitor, the active $NO_x$ monitor, and the HEGO monitor. As an example, a first monitor may indicate degradation of the HC trap, and then a second monitor may be employed to confirm the first monitor upon a subsequent engine cold start. As another example, all three monitors may be initiated during sequential engine cold starts to confirm a state of degradation of the HC trap.

At 220, routine 200 may include determining whether HC trap degradation is indicated. The determination of whether the HC trap degradation is indicated may be based on a pass flag or fault flag passed from one or more of the passive $NO_x$ monitor, the active $NO_x$ monitor, and the HEGO monitor. If HC trap degradation is indicated (e.g., if a fault flag is received), routine 200 may progress to 222 to generate a driver indication of a state of degradation or age of the HC trap, store a diagnostic code, and/or alter engine operating parameters based on the state of degradation or age of the HC trap. For example, the driver indication may include lighting a malfunction indicator lamp (MIL) and the diagnostic code may be set and stored in memory of the controller. In one example, the lighting the MIL may indicate a request that the vehicle be taken to a service technician, and the diagnostic code that is set may indicate to the technician that the HC trap is degraded. The light and the code may then reset after the vehicle has been serviced and the HC trap has been replaced. Further, during vehicle operation with the degraded HC trap, engine operating parameters may be adjusted in view of HC trap degradation. For example, operating conditions that generate additional HCs and/or $NH_3$ may be minimized. This may include, for example, limiting an engine load, as well as limiting a degree of combustion AFR richness as the HC trap age increases. Routine 200 may then progress to 224 to stop the HC trap monitor. Routine 200 then ends.

If HC trap degradation is not indicated (e.g., if a pass flag is received), routine 200 may progress to 224 to stop the HC trap monitor. Routine 200 then ends.

Referring now to FIG. 3, an example routine 300 is shown for opportunistically, or passively, monitoring a state of degradation of an HC trap, such as the second catalyst 184 of FIG. 1, based on at least a $NO_x$ sensor output. Routine 300 may be performed as part of the method of FIG. 2, such as at 214. Routine 300 enables the functionality of the HC trap to be diagnosed following an engine cold start.

At 302, routine 300 may include beginning measuring exhaust gas temperature and $NO_x$ sensor output when a downstream $NO_x$ sensor activates and is stable (e.g., warmed up). In some examples, the measuring may continue for a predetermined duration, such as 120 seconds, or the measurement may continue over a predetermined temperature window that may end when the HC trap outlet temperature exceeds 400° C. The exhaust gas temperature (e.g., the HC trap outlet temperature) may be measured using a temperature sensor positioned downstream of the HC trap, such as the fourth sensor 189 of FIG. 1. The $NO_x$ sensor output may be output by a $NO_x$ sensor positioned downstream of the HC trap, such as the third sensor 188 of FIG. 1. In some examples, each of the exhaust gas temperature and the $NO_x$ sensor output may be sampled at an increased rate (e.g., 10 Hz) relative to when the HC monitor is not being performed. In this way, a large sample data set may be obtained spanning the predetermined temperature window. Further, as explained above, the predetermined temperature window may occur during an engine warm-up following the engine cold start. As such, the predetermined temperature window may coincide with a ramp up of the exhaust gas temperature.

In some examples, the predetermined temperature window may be a diagnostic temperature range that is set during a manufacturing process of the vehicle and/or controller. Further, the predetermined temperature window may be selected so as to correspond with an approximate amount of time during which the engine warm-up increases the exhaust gas temperature across a desired temperature range, such as a temperature range during which $NH_3$ is released from the HC trap (e.g., 100 to 400° C.).

At 304, routine 300 may include determining whether abort conditions are met. The determination of whether the abort conditions are met may occur during the predetermined temperature window. The abort conditions may include, for example, the exhaust gas temperature falling below a temperature of $NH_3$ release from the HC trap and/or the exhaust gas air-fuel ratio being above an air-fuel ratio where excess $NO_x$ is present in the exhaust gas. Another example of an abort condition may include an engine shutdown occurring during the predetermined temperature window. If the abort conditions are met, for example if the exhaust gas air-fuel ratio is too lean, routine 300 may progress to 306 to stop the passive $NO_x$ monitor. Routine 300 then ends.

If the abort conditions are not met, routine 300 may progress to 308 to determine whether the HC trap outlet temperature is greater than a warm-up threshold. If the HC trap outlet temperature is less than the warm-up threshold, routine 300 may progress to 310 to continue measuring the exhaust gas temperature and acquiring the $NO_x$ sensor output until the HC trap outlet temperature exceeds the warm-up threshold or until abort conditions are met.

If the HC trap outlet temperature is greater than the warm-up threshold, routine 300 may progress to 312 to stop measuring the exhaust gas temperature and the $NO_x$ sensor output. The controller may be operable to store the measured exhaust gas temperature and $NO_x$ sensor output values in memory for use in determination of the degradation of the HC trap adsorbent material.

At 314, routine 300 may include determining a highest $NO_x$ sensor output over the predetermined temperature window. The highest $NO_x$ sensor output may be the highest value of the measured $NO_x$ output values over the predetermined temperature window. In some examples, the passive $NO_x$ monitor is executed during conditions wherein the $NO_x$ sensor detects $NH_3$ emissions while detecting substantially no $NO_x$ emissions. The measured $NO_x$ sensor output values may therefore closely approximate an $NH_3$ amount in the exhaust gas. Further, the highest $NO_x$ sensor output may closely approximate a highest $NH_3$ amount in the exhaust gas over the predetermined temperature window. Said another way, the highest $NH_3$ amount in the exhaust gas over the predetermined temperature window may be determined based on the highest $NO_x$ sensor output measured over the predetermined temperature window.

At 316, routine 300 may include determining a highest $NO_x$ sensor output temperature. The highest $NO_x$ sensor output temperature may be an exhaust gas temperature at the highest $NO_x$ sensor output. In examples wherein the $NO_x$ sensor detects $NH_3$ emissions while detecting substantially no $NO_x$ emissions, the highest $NO_x$ sensor output temperature may closely approximate an exhaust gas temperature at which the highest $NH_3$ amount in the exhaust gas is determined. Said another way, the exhaust gas temperature at which the highest $NH_3$ amount is determined may be determined based on the highest $NO_x$ sensor output temperature.

At 318, routine 300 may include determining whether the highest $NO_x$ sensor output temperature is less than a diagnostic temperature threshold. The diagnostic temperature threshold may be greater than the entry temperature threshold. The diagnostic temperature threshold may be selected so as to distinguish between exhaust gas treatment systems respectively including an active HC trap with an appreciable amount of non-degraded adsorbent material and an inactive HC trap with degraded adsorbent material. The highest $NO_x$ sensor output temperature (which corresponds to the highest $NH_3$ amount temperature, as described above) may be a function of an extent of degradation of the adsorbent material in the HC trap, as a non-degraded adsorbent material may retain $NH_3$ to higher temperatures than a degraded adsorbent material.

As an example, a highest $NO_x$ sensor output temperature for the exhaust gas treatment system including the active HC trap (e.g., 300° C.) may be higher than a highest $NO_x$ sensor output temperature for the exhaust gas treatment system including the inactive HC trap (e.g., 210° C.). As a further example, the highest $NO_x$ sensor output temperature for the exhaust gas treatment system including the inactive HC trap (e.g., 210° C.) may be higher than a highest $NO_x$ sensor output temperature for an exhaust gas treatment system including no HC trap (e.g., 190° C.). The diagnostic temperature threshold may therefore be set at a value between the highest $NO_x$ sensor output temperature expected for the exhaust gas treatment system including the inactive HC trap (e.g., 210° C.) and the highest $NO_x$ sensor output temperature expected for the exhaust gas treatment system including the active HC trap (e.g., 300° C.). In this way, the highest $NO_x$ sensor output temperature, which may correspond to the exhaust gas temperature at which the highest $NH_3$ amount is determined, may be utilized to determine a state of degradation of an HC trap.

If the highest $NO_x$ sensor output temperature is determined to be less than the diagnostic temperature threshold, routine 300 may progress to 320 to set a fault flag. In some examples, the flag may be a binary flag that only indicates that the HC trap is degraded. In other examples, the flag may include an extent of degradation of the HC trap, or an HC trap age. Routine 300 then ends.

If the highest $NO_x$ sensor output temperature is determined to be greater than the diagnostic temperature threshold, routine 300 may progress to 322 to set a pass flag. Routine 300 then ends.

Referring now to FIG. 4, an example routine 400 is shown for actively monitoring a state of degradation of an HC trap, such as the second catalyst 184 of FIG. 1, based on at least a $NO_x$ sensor output. The active monitoring may include providing an exhaust gas air-fuel ratio pulse richer than a current exhaust gas air-fuel ratio, for example. Routine 400 may be performed as part of the method of FIG. 2, such as at 216. In some examples, routine 400 may be performed as an alternative to routine 300 of FIG. 3, such as following an engine cold start in a relatively high ambient temperature (e.g., 20° C.) where, in some examples, the exhaust gas may carry excess $NO_x$ emissions which may obfuscate detection of $NH_3$ emissions stored/released by the HC trap (such $NH_3$ emissions may be used, in some examples, to infer the state of degradation of the HC trap). As such, routine 400 enables the functionality of the HC trap to be diagnosed following an engine cold start when the exhaust gas air-fuel ratio has not fallen below an entry air-fuel ratio threshold during normal operation of an engine coupled to the exhaust gas treatment system.

At 402, routine 400 may include providing a rich exhaust gas pulse at a predetermined air-fuel ratio (e.g., less than or equal to 0.95) via open loop fuel control of the engine. That is, open loop fuel control of the engine may be initiated for a short duration, such as about 10 s, to reduce the exhaust gas air-fuel ratio and limit $NO_x$ emissions to the $NO_x$ sensor(s) by not utilizing feedback from one or more exhaust gas sensors to maintain a stoichiometric exhaust gas air-fuel ratio. Additionally or alternatively, the rich exhaust gas pulse may be provided via a short-duration (e.g., 10 s) alteration of closed loop fuel control of the engine, as is typically utilized to regulate the exhaust gas air-fuel ratio at stoichiometry. In reference to FIG. 1, providing the exhaust gas at the predetermined rich air-fuel ratio may include adjusting ignition timing via ignition system 191, and/or increasing fuel injection amounts via electronic driver 168 and/or electronic driver 171. Actively providing the exhaust gas at the predetermined rich air-fuel ratio in this way may occur in response to the exhaust gas air-fuel ratio being above the entry air-fuel ratio threshold as described above with reference to FIG. 2. As such, in some examples, the exhaust gas air-fuel ratio threshold being above the entry air-fuel ratio threshold while other HC trap monitor entry conditions have been met may indicate to the controller that routine 400 (e.g., the active $NO_x$ monitor) should be employed as an alternative to routine 300 of FIG. 3 (e.g., the passive $NO_x$ monitor).

At 404, routine 400 may include beginning measuring a first $NO_x$ sensor output and/or a second $NO_x$ sensor output when each of an upstream, first $NO_x$ sensor and a downstream, second $NO_x$ sensor activate and is stable (e.g., warmed up). In some examples, the measuring may continue for a predetermined duration, such as 120 s, following the rich exhaust gas pulse or until the HC trap outlet temperature exceeds 400° C. Exhaust gas temperature (e.g., the HC trap outlet temperature) may be measured using a temperature sensor positioned downstream of the HC trap, such as the fourth sensor 189 of FIG. 1. The first $NO_x$ sensor output may be output by a $NO_x$ sensor positioned upstream of the HC trap, such as the first sensor 186 of FIG. 1. The second $NO_x$ sensor output may be measured using a $NO_x$ sensor positioned downstream of the HC trap, such as the third sensor 188 of FIG. 1. In some examples, each of the first $NO_x$ sensor output and the second $NO_x$ sensor output may be sampled at an increased rate (e.g., 10 Hz) relative to when the HC monitor is not being performed. In this way, a large sample data set may be obtained spanning the predetermined temperature window. Further, as explained above, the predetermined temperature window may occur during an engine warm-up following the engine cold start. As such, the predetermined temperature window may coincide with a ramp up of exhaust gas temperature.

In some examples, the predetermined temperature window may be a diagnostic temperature range that is set during a manufacturing process of the vehicle and/or controller. Further, the predetermined temperature window may be selected so as to correspond with an approximate amount of time during which the engine warm-up increases the exhaust gas temperature across a desired temperature range, such as a temperature range during which $NH_3$ is stored by the HC trap (e.g., 0 to 100° C.) or released by the HC trap (e.g., 100 to 400° C.).

At 406, routine 400 may include determining whether abort conditions are met. The determination of whether the abort conditions are met may occur during the predetermined temperature window. The abort conditions may include, for example, the exhaust gas temperature falling below a light-off temperature of a catalyst disposed upstream of the HC trap. Another example of an abort condition may include an engine shutdown occurring during the predetermined temperature window. If the abort conditions are met, for example if the exhaust gas temperature is too low, routine 400 may progress to 408 to stop the active $NO_x$ monitor. Routine 400 then ends.

If the abort conditions are not met, routine 400 may progress to 410 to determine whether the HC trap outlet temperature is greater than a warm-up threshold. If the HC trap outlet temperature is less than the warm-up threshold, routine 400 may progress to 412 to continue measuring and acquiring the first $NO_x$ sensor output and/or the second $NO_x$ sensor output until the HC trap outlet temperature exceeds the warm-up threshold or until abort conditions are met.

If the HC trap outlet temperature is greater than the warm-up threshold, routine 400 may progress to 414 to stop measuring the first $NO_x$ sensor output and/or the second $NO_x$ sensor output. The controller may be operable to store the measured $NO_x$ sensor output values in memory for use in determination of the degradation of the HC trap adsorbent material.

At 416, routine 400 may include determining a $NO_x$ sensor output parameter. In some examples, the active $NO_x$ monitor may be operable to generate conditions wherein the $NO_x$ sensor detects $NH_3$ emissions while detecting substantially no $NO_x$ emissions. The measured first $NO_x$ sensor output values and second $NO_x$ sensor output values may therefore closely approximate a first $NH_3$ amount in the exhaust gas upstream of the HC trap and a second $NH_3$ amount downstream of the HC trap, respectively. Said another way, the first $NH_3$ amount in the exhaust gas over the predetermined temperature window may be determined based on the first $NO_x$ sensor output measured over the predetermined temperature window and the second $NH_3$ amount in the exhaust gas over the predetermined temperature window may be determined based on the second $NO_x$ sensor output measured over the predetermined temperature window.

In some examples, the $NO_x$ sensor output parameter may be a difference between the first $NO_x$ sensor output and the second $NO_x$ sensor output over the predetermined temperature window. In one example, the first $NO_x$ sensor output may be fit to a first function and the second $NO_x$ sensor output may be fit to a second function, such that the difference may be determined based on an integration calculation of an area between the first function and the second function. Because the first $NO_x$ sensor output may correspond to the first $NH_3$ amount in the exhaust gas upstream of the HC trap and the second $NO_x$ sensor output may correspond to the second $NH_3$ amount in the exhaust gas downstream of the HC trap, the difference may closely approximate an amount of $NH_3$ stored or released by the HC trap over the predetermined temperature window. As such, a difference between the first $NH_3$ amount and the second $NH_3$ amount over the predetermined temperature window may be determined based on the difference between the first $NO_x$ sensor output and the second $NO_x$ sensor output over said predetermined temperature window.

In additional or alternative examples, the second $NO_x$ sensor output may be fit to the second function, and the $NO_x$ sensor output parameter may be an area under the second function as determined based on an integration calculation. Said another way, the $NO_x$ sensor output parameter may be a total amount of emissions detected by the second $NO_x$ sensor over the predetermined temperature window. Because the second $NO_x$ sensor output may correspond to the second $NH_3$ amount, the total amount of emissions detected by the second $NO_x$ sensor may closely approximate the $NH_3$ amount released by the HC trap over the predetermined temperature window. As such, the second $NH_3$ amount over the predetermined temperature window may be determined based on the second $NO_x$ sensor output over said predetermined temperature window.

In additional examples, a highest $NH_3$ amount over the predetermined temperature window may be determined based on the exhaust gas temperature and the second $NO_x$ sensor output. In such examples, an analogous procedure to that described at 312 to 322 of routine 300 as described in FIG. 3 may be employed to determine the state of degradation of the HC trap.

At 418, routine 400 may include determining whether the $NO_x$ sensor output parameter is less than a diagnostic threshold. The diagnostic threshold may be selected so as to distinguish between exhaust gas treatment systems respectively including an active HC trap with an appreciable amount of non-degraded adsorbent material and an inactive HC trap with degraded adsorbent material. The $NO_x$ sensor output parameter (which corresponds to the amount of $NH_3$ stored or released, as described above) may be a function of an extent of degradation of the adsorbent material in the HC trap, as a non-degraded adsorbent material may retain a greater amount of $NH_3$ than a degraded adsorbent material.

In examples wherein the $NO_x$ sensor output parameter is the difference between the first $NO_x$ sensor output and the second $NO_x$ sensor output, a difference between the first $NO_x$ sensor output and the second $NO_x$ sensor output for the exhaust gas treatment system including the active HC trap may be greater than a difference between the first $NO_x$ sensor output and the second $NO_x$ sensor output for the exhaust gas treatment system including the inactive HC trap. Said another way, the exhaust gas treatment system with the active HC trap may store more $NH_3$ emissions (which, as described above, may correspond to the difference between the first $NO_x$ sensor output and the second $NO_x$ sensor output) than the exhaust gas treatment system with the inactive HC trap. As a further example, the difference between the first $NO_x$ sensor output and the second $NO_x$ sensor output for the exhaust gas treatment system including the inactive HC trap may be greater than a difference between the first $NO_x$ sensor output and the second $NO_x$ sensor output for an exhaust gas treatment system including no HC trap. The diagnostic threshold may therefore be set at a value between the difference between the first $NO_x$ sensor output and the second $NO_x$ sensor output for the exhaust gas system including the active HC trap and the difference between the first $NO_x$ sensor output and the second $NO_x$ sensor output for the exhaust gas system including the inactive HC trap. In this way, the difference between the first $NO_x$ sensor output and the second $NO_x$ sensor output, which may correspond to the amount of $NH_3$ stored or released by the HC trap, may be utilized to determine a degradation state of an HC trap.

If the $NO_x$ sensor output parameter is determined to be less than the diagnostic threshold, routine 400 may progress to 422 to set a fault flag. In some examples, the flag may be a binary flag that only indicates that the HC trap is degraded. In other examples, the flag may include an extent of degradation of the HC trap, or an HC trap age. Routine 400 then ends.

If the $NO_x$ sensor output parameter is determined to be greater than the diagnostic threshold, routine 400 may progress to 422 to set a pass flag. Routine 400 then ends.

Referring now to FIG. 5, an example routine 500 is shown for monitoring a state of degradation of an HC trap, such as the second catalyst 184 of FIG. 1, based on HEGO sensor outputs. Routine 500 may be performed as part of the method of FIG. 2, such as at 218. In some examples, routine 500 may be performed as an alternative to routine 300 of FIG. 3 or routine 400 of FIG. 4, such as in vehicles which do not include a $NO_x$ sensor, or during conditions following a cold start wherein one or more $NO_x$ sensors disposed in an exhaust passage of a vehicle have not yet warmed up. As such, routine 500 enables the functionality of the HC trap to be diagnosed at a specified diagnostic temperature following an engine cold start.

At 502, routine 500 may include determining the diagnostic temperature. In some examples, the diagnostic temperature may be programmed during a manufacturing process. Further, the diagnostic temperature may be selected based on a temperature during which a highest amount of $NH_3$ is released from the HC trap over a predetermined temperature window (e.g., 100 to 400° C.). In such examples, an analogous procedure to that described at 302 to 316 of routine 300 as described with respect to FIG. 3 may be employed to determine the diagnostic temperature. In some examples, at least some of routine 500 may be performed simultaneously to routine 300 (e.g., the HEGO sensors outputs may be detected in accordance with routine 500 while a $NO_x$ sensor output and an exhaust gas temperature are detected in accordance with routine 300).

At 504, routine 500 may include measuring a first voltage ($V_1$) at an exhaust gas temperature at the diagnostic temperature. The first voltage $V_1$ may be output by a first HEGO sensor positioned upstream of the HC trap, such as the second sensor 187 of FIG. 1.

At 506, routine 500 may include measuring a second voltage ($V_2$) at the exhaust gas temperature at the diagnostic temperature. The second voltage $V_2$ may be output by a second HEGO sensor positioned downstream of the HC trap, such as the fifth sensor 190 of FIG. 1.

At 508, routine 500 may include determining a voltage difference. The voltage difference may be calculated according to equation (1) as:

$$V_2 - V_1 \qquad (1)$$

In some examples, the HEGO monitor may be executed in conditions wherein stored $NH_3$ emissions are being released by the HC trap. Further, the voltage difference as determined at the diagnostic temperature may be a function of an $NH_3$ amount released by the HC trap, as the released $NH_3$ emissions consume detected gas-phase oxygen over the catalyzed HEGO cell element via formation of $NO_2$, $NO$, $N_2$ and $H_2O$ byproducts. Said another way, the $NH_3$ amount released by the HC trap may be determined based on the voltage difference as measured by the first HEGO sensor and the second HEGO sensor at the diagnostic temperature.

At 510, routine 500 may include determining whether the voltage difference is less than a voltage difference threshold. The voltage threshold may be selected so as to distinguish between exhaust gas treatment systems respectively including an active HC trap with an appreciable amount of non-degraded adsorbent material and an inactive HC trap with degraded adsorbent material.

As an example, a voltage difference, as defined as the downstream HEGO signal voltage $V_2$ minus the upstream HEGO signal voltage $V_1$, for the exhaust gas treatment system including the active HC trap (e.g., 0.15 V) may be greater than a voltage difference for the exhaust gas treatment system including the inactive HC trap (e.g., 0.08 V). The voltage difference threshold may therefore be set at a value between the voltage difference for the exhaust gas treatment system including the active HC trap (e.g., 0.15 V) and the voltage difference for the exhaust gas treatment system including the inactive HC trap (e.g., 0.08 V). In this way, the $NH_3$ amount released by the HC trap at the diagnostic temperature may be determined based on the voltage difference between the first voltage $V_1$ output by the first HEGO sensor and the second voltage $V_2$ output by the second HEGO sensor at the diagnostic temperature.

If the voltage difference is determined to be less than the voltage difference threshold, routine 500 may progress to 512 to set a fault flag. In some examples, the flag may be a binary flag that only indicates that the HC trap is degraded. In other examples, the flag may include an extent of degradation of the HC trap, or an HC trap age. Routine 500 then ends.

If the voltage difference is determined to be greater than the voltage difference threshold, routine 500 may progress to 514 to set a pass flag. Routine 500 then ends.

Referring now to FIG. 6, a map 600 depicting a first example diagnostic operation indicating a non-degraded HC trap and a second example diagnostic operation indicating a degraded HC trap is shown, wherein an exhaust gas treatment system being diagnosed includes an HC trap positioned downstream of another component catalyst, such as a TWC. Each of the first example diagnostic operation and the second example diagnostic operation may utilize a passive $NO_x$ monitor, such as method 300 as described above with reference to FIG. 3.

Map 600 depicts an engine speed at solid curve 601, an exhaust gas air-fuel ratio at solid curve 611, a passive $NO_x$ monitor status at solid curve 621, an exhaust gas temperature at solid curve 631, a first $NH_3$ amount present in exhaust gas at solid curve 641 (e.g., during the first example diagnostic operation), a second $NH_3$ amount present in exhaust gas at short-dashed curve 642 (e.g., during the second example diagnostic operation), a first output of a $NO_x$ sensor at solid curve 651 (e.g., during the first example diagnostic operation), a second output of the $NO_x$ sensor at short-dashed curve 652 (e.g., during the second example diagnostic operation), a first passive $NO_x$ monitor flag at solid curve 661 (e.g., during the first example diagnostic operation), and a second passive $NO_x$ monitor flag at short-dashed curve 662 (e.g., during the second example diagnostic operation). Additionally, full-dashed curve 612 represents an entry air-fuel ratio threshold utilized as a first monitor entry condition, full-dashed curve 632 represents an entry temperature threshold utilized as a second monitor entry condition, and full-dashed curve 633 represents a diagnostic temperature threshold utilized for indication of a state of degradation of the HC trap. All curves are depicted over time (plotted along an x-axis). For simplicity, each of the first example diagnostic operation and the second diagnostic operation are depicted along the same axis. However, it will be understood that the first example diagnostic operation and the second diagnostic operation do not necessarily occur simultaneously.

Prior to t1, the vehicle is not in operation and the engine is shut down. At t1, responsive to an operator request, the engine is started. Due to the engine having been shut down longer than a threshold duration prior to t1, the engine start at t1 is determined to be an engine cold start.

Between t1 and t3, the engine cold start is ongoing. Therein, engine speed (curve 601) changes as a function of operator torque demand. Responsive to initiation of the engine cold start, the exhaust gas air-fuel ratio runs rich and ramps towards stoichiometry (curve 611). As engine speed and load increases, there is a corresponding increase in exhaust gas temperature (curve 631). Because some component catalysts have not yet reached light-off, little to no $NO_x$ is yet converted to $NH_3$ by the exhaust gas treatment system, and thus the $NH_3$ amount in the exhaust gas (curves 641 and 642) remains low. During the engine cold start, the $NO_x$ sensor downstream of the HC trap (curves 651 and 652) may require an initial duration to pass (e.g., from t1 to t2) before said sensors are warmed up and become operable (that is, the initial duration may be a third monitor entry condition in addition to the first and second monitor entry conditions described above). As such, during the initial cold-start period, the $NO_x$ sensor may become operable. The $NO_x$ sensor detects rising $NO_x$ from vehicle operation, as shown by curves 651 and 652. However, as not all component catalysts have yet reached light-off, a small amount of the $NO_x$ may remain unconverted by the exhaust gas treatment system, and may be subsequently detected by the downstream $NO_x$ sensor.

At t3, a controller coupled to the engine determines that one or more of the first monitor entry condition, the second monitor entry condition, and the third monitor entry condition have been met, and the passive $NO_x$ monitor is initiated opportunistically (curve 621). Specifically, the first monitor entry condition may correspond to the exhaust gas air-fuel ratio (curve 611) being richer than the entry air-fuel ratio threshold (curve 612) and the second monitor entry condition may correspond to the exhaust gas temperature (curve 631) being greater than the entry temperature threshold (curve 632). As such, the passive $NO_x$ monitor may be initiated when $NO_x$ emissions are limited in the exhaust gas (such as when the exhaust gas air-fuel ratio runs rich) and when the HC trap is actively beginning to release $NH_3$ (such as when the exhaust gas temperature is increasing, causing desorption from the HC trap adsorbent material). Further, the third monitor entry condition may correspond to the engine having been in operation for the initial duration, such that the $NO_x$ sensor has warmed up and is sending output (curves 651 and 652) to the controller.

Between t3 and t6, since vehicle and engine operating conditions are conducive to generation of $NH_3$ emissions via conversion of $NO_x$ emissions, the $NH_3$ amount (curves 641 and 642) and the $NO_x$ sensor output (curves 651 and 652) are closely associated. In the first example diagnostic operation, wherein the HC trap adsorbent material is not degraded, more of the $NH_3$ emissions are released later and at higher temperatures by the HC trap. A highest $NH_3$ amount occurs at t5, where the exhaust gas temperature (curve 631) has risen above the diagnostic temperature threshold (curve 633). In the second example diagnostic operation, wherein the HC trap adsorbent material is degraded, the highest $NH_3$ amount occurs at t4, that is, sooner than in the first example diagnostic operation, and where the exhaust gas temperature has not yet risen above the diagnostic temperature threshold.

At t6, the passive $NO_x$ monitor finishes (curve 621). In the first example diagnostic operation, the highest $NH_3$ amount (curve 641) occurs at t5, where the exhaust gas temperature (curve 631) is above the diagnostic temperature threshold (curve 633). As such, the HC trap adsorbent material is determined to be functional. Thus, the passive $NO_x$ monitor results in a pass flag, as shown by curve 661.

In the second example diagnostic operation, the highest $NH_3$ amount (curve 642) occurs at t4, where the exhaust gas temperature (curve 632) is below the diagnostic temperature threshold (curve 633). As such, the HC trap adsorbent material is determined to be degraded. Thus, the passive $NO_x$ monitor results in a fault flag, as shown by curve 662.

At t7, the vehicle continues typical vehicle operation until the engine is shut down.

Referring now to FIG. 7, a map 700 depicting a third example diagnostic operation indicating a non-degraded HC trap is shown, wherein an exhaust gas treatment system being diagnosed includes an HC trap positioned downstream of another component catalyst, such as a TWC. The third example diagnostic operation may utilize an active $NO_x$ monitor, such as method 400 as described above with reference to FIG. 4.

Map 700 depicts an engine speed at solid curve 701, an exhaust gas air-fuel ratio at solid curve 711, an active $NO_x$ monitor status at solid curve 721, an exhaust gas temperature at solid curve 731, a first $NH_3$ amount present in exhaust gas upstream of the HC trap at solid curve 741, a second $NH_3$ amount present in exhaust gas downstream of the HC trap at short-dashed curve 742, an output of a first $NO_x$ sensor positioned in an exhaust passage upstream of the HC trap at solid curve 751, an output of a second $NO_x$ sensor positioned in the exhaust passage downstream of the HC trap at short-dashed curve 752, and an active $NO_x$ monitor flag at solid curve 761. Additionally, full-dashed curve 732 represents an entry temperature threshold utilized as a first monitor entry condition. All curves are depicted over time (plotted along an x-axis).

Prior to t8, the vehicle is not in operation and the engine is shut down. At t8, responsive to an operator request, the engine is started. Due to the engine having been shut down longer than a threshold duration prior to t8, the engine start at t8 is determined to be an engine cold start.

Between t8 and t10, engine cold start is ongoing. Therein, engine speed (curve 701) changes as a function of operator torque demand. Responsive to initiation of the engine cold start in certain conditions (such as in relatively high ambient temperatures, e.g., 20° C.), the exhaust gas air-fuel ratio runs lean and ramps towards stoichiometry (curve 711). As engine speed and load increases, there is a corresponding increase in exhaust gas temperature (curve 731). Because some component catalysts have not yet reached light-off immediately following the engine cold start, little to no $NO_x$ is initially converted to byproducts such as $NH_3$ by the exhaust gas treatment system, and thus the $NH_3$ amount in the exhaust gas (curves 741 and 742) is relatively low at t8, ramping up as the exhaust gas temperature increases (curve 731). During the engine cold start, the first $NO_x$ sensor upstream of the HC trap (curve 751) and the second $NO_x$ sensor downstream of the HC trap (curve 752) may require an initial duration (e.g., from t8 to t9) to pass before said sensors are warmed up and become operable (that is, the initial duration may be a second monitor entry condition in addition to the first monitor entry condition described above). As such, during the initial cold-start period, the first NO$_x$ sensor may become operable, followed later by the second NO$_x$ sensor, as the second NO$_x$ sensor is located farther from the engine. The first and second NO$_x$ sensors detect rising NO$_x$ from vehicle operation, as shown by curves 751 and 752.

At t10, a controller coupled to the engine determines that one or more of the first monitor entry condition and the second monitor entry condition have been met. Specifically, the first monitor entry condition may correspond to the exhaust gas temperature (curve 731) being greater than the entry temperature threshold (curve 732). As such, the active NO$_x$ monitor may be initiated when a component catalyst upstream of the HC trap, such as a TWC, is lit off and converting NO$_x$ emissions to byproducts such as NH$_3$. Further, the second monitor entry condition may correspond to the engine having been in operation for the initial duration, such that the first and second NO$_x$ sensors have warmed up and are sending output (curves 751 and 752) to the controller. The active NO$_x$ monitor is then initiated (curve 721) to provide a rich exhaust gas pulse, as shown by curve 711, and consequently result in a pulse of NH$_3$ being sent to the HC trap.

Between t10 and t11, since vehicle and engine operating conditions are conducive to generation of NH$_3$ emissions via conversion of NO$_x$ emissions, the NH$_3$ amount (curves 741 and 742) and the first and second NO$_x$ sensor outputs (curves 751 and 752) are closely associated. In the third example diagnostic operation, the HC trap adsorbent material is not degraded, resulting in a greater difference between NH$_3$ emissions upstream of the HC trap (curve 741) and downstream of the HC trap (curve 742) relative to an exhaust gas treatment system with a degraded HC trap. Correspondingly, a greater difference is observed between the first NO$_x$ sensor output (curve 751) and the second NO$_x$ sensor output (curve 752) relative to the exhaust gas treatment system with the degraded HC trap.

At t11, the active NO$_x$ monitor finishes (curve 721). In the third example diagnostic operation, the difference between the first NO$_x$ sensor output (curve 751) and the second NO$_x$ sensor output (curve 752) is determined to be greater than a diagnostic threshold. As such, the HC trap adsorbent material is determined to be functional. Thus, the active NO$_x$ monitor results in a pass flag, as shown by curve 761.

At t12, the vehicle continues typical vehicle operation until the engine is shut down.

Referring now to FIG. 8, a map 800 depicting a fourth example diagnostic operation indicating a degraded HC trap is shown, wherein an exhaust gas treatment system being diagnosed includes an HC trap positioned downstream of another component catalyst, such as a TWC. The fourth example diagnostic operation may utilize an active NO$_x$ monitor, such as method 400 as described above with reference to FIG. 4.

Map 800 depicts an engine speed at solid curve 801, an exhaust gas air-fuel ratio at solid curve 811, an active NO$_x$ monitor status at solid curve 821, an exhaust gas temperature at solid curve 831, a first NH$_3$ amount present in exhaust gas upstream of the HC trap at solid curve 841, a second NH$_3$ amount present in exhaust gas downstream of the HC trap at short-dashed curve 842, an output of a first NO$_x$ sensor positioned in an exhaust passage upstream of the HC trap at solid curve 851, an output of a second NO$_x$ sensor positioned in the exhaust passage downstream of the HC trap at short-dashed curve 852, and an active NO$_x$ monitor flag at solid curve 861. Additionally, full-dashed curve 832 represents an entry temperature threshold utilized as a first monitor entry condition. All curves are depicted over time (plotted along an x-axis).

Prior to t13, the vehicle is not in operation and the engine is shut down. At t13, responsive to an operator request, the engine is started. Due to the engine having been shut down longer than a threshold duration prior to t13, the engine start at t13 is determined to be an engine cold start.

Between t13 and t15, engine cold start is ongoing. Therein, engine speed (curve 801) changes as a function of operator torque demand. Responsive to initiation of the engine cold start in certain conditions (such as in relatively high ambient temperatures, e.g., 20° C.), the exhaust gas air-fuel ratio runs lean and ramps towards stoichiometry (curve 811). As engine speed and load increases, there is a corresponding increase in exhaust gas temperature (curve 831). Because some component catalysts have not yet reached light-off immediately following the engine cold start, little to no NO$_x$ is initially converted to byproducts such as NH$_3$ by the exhaust gas treatment system, and thus the NH$_3$ amount in the exhaust gas (curves 841 and 842) is relatively low at t13, ramping up as the exhaust gas temperature increases (curve 831). During the engine cold start, the first NO$_x$ sensor upstream of the HC trap (curve 851) and the second NO$_x$ sensor downstream of the HC trap (curve 852) may require an initial duration (e.g., from t13 to t14) to pass before said sensors are warmed up and become operable (that is, the initial duration may be a second monitor entry condition in addition to the first monitor entry condition described above). As such, during the initial cold-start period, the first NO$_x$ sensor may become operable, followed later by the second NO$_x$ sensor, as the second NO$_x$ sensor is located farther from the engine. The first and second NO$_x$ sensors detect rising NO$_x$ from vehicle operation, as shown by curves 851 and 852.

At t15, a controller coupled to the engine determines that one or more of the first monitor entry condition and the second monitor entry condition have been met. Specifically, the first monitor entry condition may correspond to the exhaust gas temperature (curve 831) being greater than the entry temperature threshold (curve 832). As such, the active NO$_x$ monitor may be initiated when a component catalyst upstream of the HC trap, such as a TWC, is lit off and converting NO$_x$ emissions to byproducts such as NH$_3$. Further, the second monitor entry condition may correspond to the engine having been in operation for the initial duration, such that the first and second NO$_x$ sensors have warmed up and are sending output (curves 851 and 852) to the controller. The active NO$_x$ monitor is then initiated (curve 821) to provide a rich exhaust gas pulse, as shown by curve 811, and consequently actively limit NO$_x$ emissions.

Between t15 and t16, since vehicle and engine operating conditions are conducive to generation of NH$_3$ emissions via conversion of NO$_x$ emissions, the NH$_3$ amount (curves 841 and 842) and the first and second NO$_x$ sensor outputs (curves 851 and 852) are closely associated. In the fourth example diagnostic operation, the HC trap adsorbent material is degraded, resulting in a smaller difference between NH$_3$ emissions upstream of the HC trap (curve 841) and downstream of the HC trap (curve 842) relative to an exhaust gas treatment system with a functional HC trap. Correspondingly, a smaller difference is observed between the first NO$_x$ sensor output (curve 851) and the second NO$_x$ sensor output (curve 852) relative to the exhaust gas treatment system with the functional HC trap.

At t16, the active NO$_x$ monitor finishes (curve 821). In the fourth example diagnostic operation, the difference between the first $NO_x$ sensor output (curve 851) and the second $NO_x$ sensor output (curve 852) is determined to be lower than a diagnostic threshold. As such, the HC trap adsorbent material is determined to be degraded. Thus, the active $NO_x$ monitor results in a fault flag, as shown by curve 861.

At t17, the vehicle continues typical vehicle operation until the engine is shut down.

Referring now to FIGS. 9-12, various configurations of TWC and/or HC trap samples were exposed to simulated aging in an exemplary exhaust passage environment. In some examples, the configurations of the TWC and/or HC trap samples may represent at least some of the exhaust gas treatment systems as described above with reference to FIGS. 1-8.

Referring now to FIG. 9, plots 900, 920, and 940 depict $NO_x$ sensor outputs in exhaust gas treatment systems including an active HC trap, an inactive HC trap, and no HC trap zeolite material, respectively. Further, each of the exhaust gas treatment systems include a TWC. In each of the exhaust gas treatment systems including an HC trap, the TWC was respectively disposed upstream of said HC trap. Each of the $NO_x$ sensors described with reference to plots 900, 920, and 940 achieves light-off by 100° C. Further, each TWC has respectively achieved light-off by 100° C., and thus little to no $NO_x$ emissions are present in an exhaust gas flow downstream of each TWC above this temperature. Above 100° C., most emissions detected by $NO_x$ sensors disposed downstream of component catalysts of the exhaust gas treatment systems described with reference to plots 900, 920, and 940 are therefore attributed to $NH_3$. In each of plots 900, 920, and 940, exhaust gas temperature downstream of component catalysts of the corresponding exhaust gas treatment system is respectively plotted along an x-axis and detected $NO_x$ and $NH_3$ emissions are respectively plotted along a y-axis.

Each of curves 901, 921, and 941 plot combined $NO_x$ and $NH_3$ emissions as detected by a first $NO_x$ sensor disposed upstream of the component catalyst(s) of the respective exhaust gas treatment systems. Further, each of curves 902, 922, and 942 plot combined $NO_x$ and $NH_3$ emissions as detected by a second $NO_x$ sensor disposed downstream of the component catalyst(s) of the respective exhaust gas treatment systems. As shown, there are significant differences between the signals relayed by the second $NO_x$ sensors in the exhaust gas treatment systems. Notably, a highest $NO_x$ sensor output occurs at a different temperature for each respective exhaust gas treatment system. In plot 900, which depicts the exhaust gas treatment system with the active HC trap, a highest $NO_x$ sensor output 903 occurs at around 300° C. In plot 920, which depicts the exhaust gas treatment system with the inactive HC trap, a highest $NO_x$ sensor output 923 occurs at around 210° C. In plot 940, which depicts the exhaust gas treatment system with no HC trap zeolite material, a highest $NO_x$ sensor output 943 occurs at around 190° C. Further, as the $NO_x$ sensor output may largely be ascribed to detected $NH_3$ emissions, each of the highest $NO_x$ sensor outputs closely approximate a respective highest $NH_3$ amount in the exhaust gas flow. In this way, the highest $NH_3$ amount in an exhaust gas flow may be utilized to distinguish between, and diagnose, exhaust gas treatment systems including an active HC trap, an inactive HC trap, and no HC trap zeolite material.

Referring now to FIG. 10, plots 1000, 1020, and 1040 depict $NO_x$ sensor outputs in exhaust gas treatment systems including an active HC trap, an inactive HC trap, and no HC trap zeolite material, respectively. Further, each of the exhaust gas treatment systems include a TWC. In each of the exhaust gas treatment systems including an HC trap, the TWC was respectively disposed upstream of said HC trap. Each of the $NO_x$ sensors described with reference to plots 1000, 1020, and 1040 are warmed up by 75 s. Further, each TWC has respectively achieved light-off by 75 s, and thus little to no $NO_x$ emissions are present in an exhaust gas flow downstream of each TWC after this time. After 75 s, most emissions detected by $NO_x$ sensors disposed downstream of component catalysts of the exhaust gas treatment systems described with reference to plots 1000, 1020, and 1040 are therefore attributed to $NH_3$. In each of plots 1000, 1020, and 1040, time is respectively plotted along an x-axis and detected $NO_x$ and $NH_3$ emissions are respectively plotted along a y-axis.

Each of curves 1001, 1021, and 1041 plot combined $NO_x$ and $NH_3$ emissions as detected by a first $NO_x$ sensor disposed upstream of the component catalyst(s) of the respective exhaust gas treatment systems. Further, each of curves 1002, 1022, and 1042 plot combined $NO_x$ and $NH_3$ emissions as detected by a second $NO_x$ sensor disposed downstream of the component catalyst(s) of the respective exhaust gas treatment systems. A pulse of rich exhaust gas carrying limited $NO_x$ emissions is provided between 75 and 85 s, such that $NH_3$ will flow downstream of each TWC following chemical conversion of said $NO_x$ emissions. As shown, signals relayed by the first and second $NO_x$ sensors display significant differences between plots 1000, 1020, and 1040. In plot 1000, which depicts the exhaust gas treatment system with the active HC trap, inset 1003 shows a relatively flat second $NO_x$ sensor output immediately following the rich exhaust gas pulse, indicating storage of the converted $NO_x$ emissions (e.g., the $NH_3$ emissions) by the active HC trap. In plot 1020, which depicts the exhaust gas treatment system with the inactive HC trap, inset 1023 shows a significantly greater second $NO_x$ sensor output immediately following the rich exhaust gas pulse as compared to the exhaust gas treatment system including the active HC trap. In plot 1020, the inactive HC trap enables weak adsorption of inlet $NH_3$ emissions. However, the active sites responsible for the $NH_3$ retention shown in plot 1000 are deactivated in the inactive HC trap. In plot 1040, where the TWC in the corresponding exhaust gas treatment system includes the HC trap catalytic converter washcoat layer with the zeolite bottom washcoat material replaced with an equal weight of inert alumina, inset 1043 also shows a significantly greater second $NO_x$ sensor output immediately following the rich exhaust gas pulse as compared to the exhaust gas treatment system including the active HC trap. As such, the exhaust gas treatment system described with reference to plot 1040 is similar to the inactive HC trap in the exhaust gas treatment system described with reference to plot 1020, indicating that relatively weak $NH_3$ storage sites in the HC trap catalytic converter washcoat layer and inactive TWC are related to common catalyzed materials in the top washcoat. Further, as the $NO_x$ sensor output may largely be ascribed to detected $NH_3$ emissions, each of the second $NO_x$ sensor outputs closely approximates a respective downstream $NH_3$ amount in the exhaust gas flow. In this way, the $NH_3$ amount in an exhaust gas flow may be utilized to distinguish between, and diagnose, an exhaust gas treatment system including an active HC trap and exhaust gas treatment systems including an inactive HC trap or no HC trap zeolite material.

Referring now to FIG. 11, plot 1100 depicts curves 1101, 1102, and 1103, which plot $NO_x$ sensor outputs in exhaust gas treatment systems including an active HC trap, an inactive HC trap, and no HC trap zeolite material, respectively. Further, each of the exhaust gas treatment systems include a TWC. In each of the exhaust gas treatment systems including an HC trap, the TWC was respectively disposed upstream of said HC trap. Each of the $NO_x$ sensors described with reference to plot 1100 are warmed up by 75 s. Further, each TWC has respectively achieved light-off by 75 s, and thus little to no $NO_x$ emissions are present in an exhaust gas flow downstream of each TWC after this time. After 75 s, most emissions detected by $NO_x$ sensors disposed downstream of component catalysts of the exhaust gas treatment systems described with reference to plot 1100 are therefore attributed to $NH_3$. In plot 1100, exhaust gas temperatures downstream of component catalysts of the exhaust gas treatment systems are plotted along an x-axis and detected $NO_x$ and $NH_3$ emissions are plotted along a y-axis.

Each of curves 1101, 1102, and 1103 plot combined $NO_x$ and $NH_3$ emissions as detected by a $NO_x$ sensor disposed downstream of the component catalyst(s) of the respective exhaust gas treatment systems. A pulse of rich exhaust gas carrying limited $NO_x$ emissions is provided between 75 and 85 s, such that $NH_3$ will flow downstream of each TWC following chemical conversion of said $NO_x$ emissions. As shown, signals relayed by the $NO_x$ sensors display significant differences between curves 1101, 1102, and 1103. Curve 1101, which depicts the exhaust gas treatment system with the active HC trap, shows a relatively flat $NO_x$ sensor output immediately following the rich exhaust gas pulse, indicating storage of the converted $NO_x$ emissions (e.g., the $NH_3$ emissions) by the active HC trap. Curve 1102, which depicts the exhaust gas treatment system with the inactive HC trap, shows a significantly greater $NO_x$ sensor output immediately following the rich exhaust gas pulse as compared to the exhaust gas treatment system including the active HC trap. Curve 1103, which depicts the exhaust gas treatment system with no HC trap zeolite material, also shows a significantly greater second $NO_x$ sensor output immediately following the rich exhaust gas pulse as compared to the exhaust gas treatment system including the active HC trap. As such, trends shown in plot 1100 are consistent with trends shown in plots 1000, 1020, and 1040, as described above with reference to FIG. 10. Further, as the $NO_x$ sensor output may largely be ascribed to detected $NH_3$ emissions, each of the $NO_x$ sensor outputs closely approximates a respective downstream $NH_3$ amount in the exhaust gas flow. In this way, the $NH_3$ amount in an exhaust gas flow may be utilized to distinguish between, and diagnose, an exhaust gas treatment system including an active HC trap and exhaust gas treatment systems including an inactive HC trap or no HC trap zeolite material.

Referring now to FIG. 12, plots 1200, 1220, and 1240 depict $NO_x$ sensor outputs and HEGO sensor voltage outputs in exhaust gas treatment systems including an active HC trap, an inactive HC trap, and no HC trap zeolite material, respectively. Further, each of the exhaust gas treatment systems include a TWC. In each of the exhaust gas treatment systems including the active HC trap, the TWC was disposed upstream of said HC trap. Each of the $NO_x$ sensors described with reference to plots 1200, 1220, and 1240 achieves light-off by 100° C. Conditions are such that each TWC has respectively achieved light-off by 100° C., and thus substantially all $NO_x$ emissions in an exhaust gas flow are respectively converted by each TWC to byproducts such as $NH_3$ above this temperature. In each of plots 1200, 1220, and 1240, exhaust gas temperature downstream of component catalysts of the corresponding exhaust gas treatment system is respectively plotted along an x-axis, detected $NO_x$ and $NH_3$ emissions are respectively plotted along a left y-axis, and a HEGO voltage signal is respectively plotted along a right y-axis.

Each of curves 1201, 1221, and 1241 plot combined $NO_x$ and $NH_3$ emissions as detected by a first $NO_x$ sensor disposed upstream of the component catalyst(s) of the respective exhaust gas treatment systems. Further, each of curves 1202, 1222, and 1242 plot combined $NO_x$ and $NH_3$ emissions as detected by a second $NO_x$ sensor disposed downstream of the component catalyst(s) of the respective exhaust gas treatment systems. As shown, there are significant differences between the signals relayed by the second $NO_x$ sensors in the exhaust gas treatment systems. Notably, a highest $NO_x$ sensor output occurs at a different temperature for each respective exhaust gas treatment system. In plot 1200, which depicts the exhaust gas treatment system with the active HC trap, a highest $NO_x$ sensor output 1203 occurs at around 300° C. In plot 1220, which depicts the exhaust gas treatment system with the inactive HC trap, a highest $NO_x$ sensor output 1223 occurs at around 210° C. In plot 1240, which depicts the exhaust gas treatment system with no HC trap zeolite material, a highest $NO_x$ sensor output 1243 occurs at around 190° C. Further, as the $NO_x$ sensor output may largely be ascribed to detected $NH_3$ emissions, each of the highest $NO_x$ sensor outputs closely approximate a respective highest $NH_3$ amount in the exhaust gas flow. In this way, the highest $NH_3$ amount in an exhaust gas flow may be utilized to distinguish between exhaust gas treatment systems including an active HC trap, an inactive HC trap, and no HC trap zeolite material.

Each of curves 1211, 1231, and 1251 plot voltage outputs from a first HEGO sensor disposed upstream of the component catalyst(s) of the respective exhaust gas treatment systems. Further, each of curves 1212, 1232, and 1252 plot voltage outputs as detected by a second HEGO sensor disposed downstream of the component catalyst(s) of the respective exhaust gas treatment systems. As shown, voltage outputs relayed by the first and second HEGO sensors display significant differences between plots 1200, 1220, and 1240 in temperature ranges which promote release of $NH_3$ by an HC trap. In plot 1200, at an exhaust gas temperature where the highest $NO_x$ sensor output 1203 is detected (about 300° C.), voltage difference 1213 is about 0.15 V. In plot 1220, at an exhaust gas temperature where the highest $NO_x$ sensor output 1223 is detected (about 210° C.), voltage difference 1233 is about 0.08 V. In plot 1240, at an exhaust gas temperature where the highest $NO_x$ sensor output 1243 is detected (about 190° C.), voltage difference 1253 is about 0.08 V. Such relative differences in voltage outputs from the first and second HEGO sensors between plot 1200 and plots 1220 and 1240 may be ascribed to differing amounts of oxygenated byproducts from decomposition of $NH_3$ emissions released by the active HC trap in the exhaust gas treatment system described with reference to plot 1200, which are absent in the exhaust gas treatment systems described with reference to plots 1220 and 1240, which include the inactive HC trap and no HC trap zeolite material, respectively. In this way, an $NH_3$ amount released by an HC trap may be inferred from voltage outputs of HEGO sensors disposed in an exhaust passage upstream and downstream of the HC trap to distinguish between, and diagnose, an exhaust gas treatment system including an active HC trap and exhaust gas treatment systems including an inactive HC trap or no HC trap zeolite material.

In this way, $NH_3$ emissions may be determined in an exhaust gas as a means of diagnosing degradation of adsorbent material in an HC trap. As an example, outputs from one or more $NO_x$ sensors may be utilized during low-$NO_x$ conditions to determine an $NH_3$ amount in the exhaust gas. The $NH_3$ amount may correspond to $NH_3$ stored/released by the HC trap. A technical effect of utilizing the one or more $NO_x$ sensor outputs to diagnose HC trap degradation is that issues endemic to other OBD methods may be mitigated. That is, determining HC trap degradation based on stored/released $NH_3$ emissions may be more accurate than other OBD methods for HC trap degradation based on stored/released HC emissions. As another example, a voltage difference between upstream and downstream HEGO sensors may be correlated with $NH_3$ release at a diagnostic temperature as determined via a temperature sensor. A technical effect of utilizing outputs of the HEGO sensors in tandem with outputs from the temperature sensor is that inaccuracies which may arise in OBD methods employing only one type of sensor may be ameliorated.

An example of a method for an engine comprises indicating degradation of a hydrocarbon trap based on at least a first $NO_x$ sensor output. A first example of the method further includes wherein indicating the degradation of the hydrocarbon trap based on at least the first $NO_x$ sensor output includes determining a highest $NH_3$ amount over a predetermined temperature window based on the first $NO_x$ sensor output, and indicating the degradation of the hydrocarbon trap based on the highest $NH_3$ amount, wherein the first $NO_x$ sensor output is output by a first $NO_x$ sensor disposed downstream of the hydrocarbon trap in an exhaust passage coupled to the engine. A second example of the method, optionally including the first example of the method, further includes wherein indicating the degradation of the hydrocarbon trap based on the highest $NH_3$ amount includes determining an exhaust gas temperature at which the highest $NH_3$ amount is determined, and responsive to the exhaust gas temperature being lower than a temperature threshold, indicating the degradation of the hydrocarbon trap, wherein the exhaust gas temperature is measured via a temperature sensor disposed adjacent to the first $NO_x$ sensor in the exhaust passage. A third example of the method, optionally including one or more of the first and second examples of the method, further comprises providing exhaust gas at a predetermined air-fuel ratio prior to reaching a predetermined temperature window. A fourth example of the method, optionally including one or more of the first through third examples of the method, further includes wherein indicating the degradation of the hydrocarbon trap based on at least the first $NO_x$ sensor output includes determining a difference between the first $NO_x$ sensor output and a second $NO_x$ sensor output, and responsive to the difference being less than a difference threshold, indicating the degradation of the hydrocarbon trap, wherein the second $NO_x$ sensor output is output by a second $NO_x$ sensor disposed upstream of the hydrocarbon trap in an exhaust passage. A fifth example of the method, optionally including one or more of the first through fourth examples of the method, further includes wherein the difference threshold is determined based on an amount of $NH_3$ stored or released by the hydrocarbon trap over the predetermined temperature window. A sixth example of the method, optionally including one or more of the first through fifth examples of the method, further includes wherein indicating the degradation of the hydrocarbon trap based on at least the first $NO_x$ sensor output comprises only indicating the degradation of the hydrocarbon trap based on at least the first $NO_x$ sensor output responsive to a plurality of diagnostic entry conditions being met, the plurality of diagnostic entry conditions comprising an exhaust gas air-fuel ratio being less than an air-fuel ratio threshold, the engine having been in operation over an initial duration immediately following an engine cold start, and an exhaust gas temperature being greater than a temperature threshold.

An example of a method for an engine comprises, responsive to a plurality of diagnostic entry conditions being met, determining a first $NH_3$ amount based on a first $NO_x$ sensor output, and indicating degradation of a hydrocarbon trap based on at least the first $NH_3$ amount, wherein the plurality of diagnostic entry conditions comprises the engine having been in operation over a first duration immediately following an engine cold start, and wherein the first $NO_x$ sensor output is output by a first $NO_x$ sensor disposed in an exhaust passage coupled to the engine. A first example of the method further comprises, responsive to initiation of the engine cold start, flowing exhaust gas from the engine through the exhaust passage, wherein the plurality of diagnostic entry conditions further comprises exhaust gas air-fuel ratio lower than an air-fuel ratio threshold, and exhaust gas temperature greater than a temperature threshold. A second example of the method, optionally including the first example of the method, further includes wherein the first $NH_3$ amount is a highest $NH_3$ amount over a predetermined temperature window. A third example of the method, optionally including one or more of the first and second examples of the method, further includes wherein indicating the degradation of the hydrocarbon trap based on at least the first $NH_3$ amount includes determining an exhaust gas temperature at which the first $NH_3$ amount is determined, and responsive to the exhaust gas temperature being lower than a temperature threshold, indicating the degradation of the hydrocarbon trap, wherein the exhaust gas temperature is measured via a temperature sensor disposed in the exhaust passage. A fourth example of the method, optionally including one or more of the first through third examples of the method, further comprises providing exhaust gas at a predetermined air-fuel ratio over a second duration via open loop fuel control of the engine. A fifth example of the method, optionally including one or more of the first through fourth examples of the method, further comprises responsive to the plurality of diagnostic entry conditions being met determining a second $NH_3$ amount based on a second $NO_x$ sensor output, wherein the second $NO_x$ sensor output is output by a second $NO_x$ sensor disposed in the exhaust passage. A sixth example of the method, optionally including one or more of the first through fifth examples of the method, further includes wherein the second $NO_x$ sensor is disposed upstream of the first $NO_x$ sensor in the exhaust passage and the hydrocarbon trap is positioned intermediate the second $NO_x$ sensor and the first $NO_x$ sensor. A seventh example of the method, optionally including one or more of the first through sixth examples of the method, further includes wherein indicating the degradation of the hydrocarbon trap based on at least the first $NH_3$ amount includes determining a difference between the first $NH_3$ amount and the second $NH_3$ amount, and responsive to the difference being less than a difference threshold, indicating the degradation of the hydrocarbon trap.

An example of a method for an engine comprises, responsive to a plurality of diagnostic entry conditions being met, indicating degradation of a hydrocarbon trap based on an $NH_3$ amount in an exhaust gas. A first example of the method further includes wherein the plurality of diagnostic entry conditions comprises an exhaust gas air-fuel ratio being less than an air-fuel ratio threshold, and the engine having been in operation over an initial duration immediately following a cold start. A second example of the method, optionally including the first example of the method, further includes wherein indicating the degradation of the hydrocarbon trap based on the $NH_3$ amount in the exhaust gas includes determining a diagnostic temperature at which the $NH_3$ amount is released by the hydrocarbon trap, determining a voltage difference between a first voltage output by a first heated exhaust gas oxygen (HEGO) sensor when exhaust gas temperature at the first HEGO sensor is at the diagnostic temperature and a second voltage output by a second HEGO sensor when exhaust gas temperature at the second HEGO sensor is at the diagnostic temperature, the first HEGO sensor disposed upstream of the hydrocarbon trap in an exhaust passage coupled to the engine, and the second HEGO sensor disposed downstream of the hydrocarbon trap in the exhaust passage, and responsive to the voltage difference being lower than a voltage difference threshold, indicating the degradation of the hydrocarbon trap. A third example of the method, optionally including one or more of the first and second examples of the method, further includes wherein the plurality of diagnostic entry conditions further comprises an exhaust gas temperature being greater than a temperature threshold. A fourth example of the method, optionally including one or more of the first through third examples of the method, further includes wherein the $NH_3$ amount is determined based on at least one $NO_x$ sensor output.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   storing emissions including at least HC and $NH_3$ during a lower, first temperature of engine operation in a hydrocarbon trap, the hydrocarbon trap including a zeolite molecular adsorbent material;
   releasing the stored emissions once exhaust gas temperature has reached a higher, second desorption temperature in which downstream catalysts and/or a sensor is active; and
   indicating degradation of the hydrocarbon trap based on at least a first NOx sensor output and alignment of the second desorption temperature to a functional state of the zeolite.

2. The method of claim 1, wherein indicating the degradation of the hydrocarbon trap based on at least the first $NO_x$, sensor output includes:
   determining a highest $NH_3$ amount over a predetermined temperature window based on the first $NO_x$ sensor output; and
   indicating the degradation of the hydrocarbon trap based on the highest $NH_3$ amount;
   wherein the first $NO_x$ sensor output is output by a first $NO_x$ sensor disposed downstream of the hydrocarbon trap in an exhaust passage coupled to the engine.

3. The method of claim 2, wherein indicating the degradation of the hydrocarbon trap based on the highest $NH_3$ amount includes:
   determining an exhaust gas temperature at which the highest $NH_3$ amount is determined; and
   responsive to the exhaust gas temperature being lower than a temperature threshold, indicating the degradation of the hydrocarbon trap;
   wherein the exhaust gas temperature is measured via a temperature sensor disposed adjacent to the first $NO_x$ sensor in the exhaust passage.

4. The method of claim 1, further comprising:
   providing exhaust gas at a predetermined air-fuel ratio prior to reaching a predetermined temperature window.

5. The method of claim 4, wherein indicating the degradation of the hydrocarbon trap based on at least the first $NO_x$ sensor output includes:
   determining a difference between the first $NO_x$ sensor output and a second $NO_x$ sensor output; and
   responsive to the difference being less than a difference threshold, indicating the degradation of the hydrocarbon trap;
   wherein the second $NO_x$ sensor output is output by a second $NO_x$ sensor disposed upstream of the hydrocarbon trap in an exhaust passage.

6. The method of claim 5, wherein the difference threshold is determined based on an amount of $NH_3$ stored or released by the hydrocarbon trap over the predetermined temperature window.

7. The method of claim 1, wherein indicating the degradation of the hydrocarbon trap based on at least the first $NO_x$ sensor output comprises only indicating the degradation of the hydrocarbon trap based on at least the first $NO_x$ sensor output responsive to a plurality of diagnostic entry conditions being met, the plurality of diagnostic entry conditions comprising:
an exhaust gas air-fuel ratio being less than an air-fuel ratio threshold;
the engine having been in operation over an initial duration immediately following an engine cold start; and
an exhaust gas temperature being greater than a temperature threshold.

8. A method for an engine, comprising:
storing emissions including at least HC, $NH_3$, and water during a lower, first temperature of engine operation in a hydrocarbon trap, the hydrocarbon trap including a zeolite molecular adsorbent material;
releasing the stored emissions once exhaust gas temperature has reached a higher, second desorption temperature in which downstream catalysts and/or a sensor is active; and
responsive to a plurality of diagnostic entry conditions being met:
determining a first $NH_3$ amount based on a First NOx sensor output; and
indicating degradation of the hydrocarbon trap based on at least the first $NH_3$ amount;
wherein the plurality of diagnostic entry conditions comprises the engine having been in operation over a first duration immediately following an engine cold start; and
wherein the first NOx sensor output is output by a first NOx sensor disposed in an exhaust passage coupled to the engine.

9. The method of claim 8, further comprising:
responsive to initiation of the engine cold start, flowing exhaust gas from the engine through the exhaust passage;
wherein the plurality of diagnostic entry conditions further comprises:
an exhaust gas air-fuel ratio lower than an air-fuel ratio threshold; and
an exhaust gas temperature greater than a temperature threshold.

10. The method of claim 8, wherein the first $NH_3$ amount is a highest $NH_3$ amount over a predetermined temperature window.

11. The method of claim 8, wherein indicating the degradation of the hydrocarbon trap based on at least the first $NH_3$ amount includes:
determining an exhaust gas temperature at which the first $NH_3$ amount is determined; and
responsive to the exhaust gas temperature being lower than a temperature threshold, indicating the degradation of the hydrocarbon trap;
wherein the exhaust gas temperature is measured via a temperature sensor disposed in the exhaust passage.

12. The method of claim 8, further comprising:
providing exhaust gas at a predetermined air-fuel ratio over a second duration via open loop fuel control of the engine.

13. The method of claim 12, further comprising:
responsive to the plurality of diagnostic entry conditions being met:
determining a second $NH_3$ amount based on a second $NO_x$ sensor output;
wherein the second $NO_x$ sensor output is output by a second $NO_x$ sensor disposed in the exhaust passage.

14. The method of claim 13, wherein the second $NO_x$ sensor is disposed upstream of the first $NO_x$ sensor in the exhaust passage and the hydrocarbon trap is positioned intermediate the second $NO_x$ sensor and the first $NO_x$ sensor.

15. The method of claim 14, wherein indicating the degradation of the hydrocarbon trap based on at least the first $NH_3$ amount includes:
determining a difference between the first $NH_3$ amount and the second $NH_3$ amount; and
responsive to the difference being less than a difference threshold, indicating the degradation of the hydrocarbon trap.

16. A method for an engine, comprising:
storing emissions including at least HC, $NH_3$, and water during a lower, first temperature of engine operation in a hydrocarbon trap;
releasing the stored emissions once exhaust gas temperature has reached a higher, second desorption temperature in which downstream catalysts and/or a sensor is active; and
responsive to a plurality of diagnostic entry conditions being met, indicating degradation of the hydrocarbon trap based on an $NH_3$ amount in an exhaust gas.

17. The method of claim 16, wherein the plurality of diagnostic entry conditions comprises:
an exhaust gas air-fuel ratio being less than an air-fuel ratio threshold; and
the engine having been in operation over an initial duration immediately following a cold start.

18. The method of claim 17, wherein indicating the degradation of the hydrocarbon trap based on the $NH_3$ amount in the exhaust gas includes:
determining a diagnostic temperature at which the $NH_3$ amount is released by the hydrocarbon trap;
determining a voltage difference between a first voltage output by a first heated exhaust gas oxygen (HEGO) sensor when exhaust gas temperature at the first HEGO sensor is at the diagnostic temperature and a second voltage output by a second HEGO sensor when exhaust gas temperature at the second HEGO sensor is at the diagnostic temperature, the first HEGO sensor disposed upstream of the hydrocarbon trap in an exhaust passage coupled to the engine, and the second HEGO sensor disposed downstream of the hydrocarbon trap in the exhaust passage; and
responsive to the voltage difference being lower than a voltage difference threshold, indicating the degradation of the hydrocarbon trap.

19. The method of claim 17, wherein the plurality of diagnostic entry conditions further comprises:
an exhaust gas temperature being greater than a temperature threshold.

20. The method of claim 19, wherein the $NH_3$ amount is determined based on at least one $NO_x$ sensor output.

* * * * *